United States Patent [19]

Sato et al.

[11] Patent Number: 5,416,535
[45] Date of Patent: May 16, 1995

[54] REMOTE CONTROL SYSTEM AND CONTROL METHOD

[75] Inventors: Kazuhiro Sato, Tokyo; Osamu Sakurai, Kanagawa, both of Japan

[73] Assignee: Sony Corporation, Japan

[21] Appl. No.: 183,835

[22] Filed: Jan. 21, 1994

[30] Foreign Application Priority Data

Feb. 5, 1993 [JP] Japan ................... 5-040737

[51] Int. Cl.⁶ ..................... H04N 5/50; H04N 5/268
[52] U.S. Cl. ..................... 348/706; 348/564; 348/734
[58] Field of Search ............ 348/705, 706, 734, 731, 348/565, 569, 564, 570; 340/825.24, 825.25; H04N 5/50, 5/268

[56] References Cited

U.S. PATENT DOCUMENTS

| | | | |
|---|---|---|---|
| 4,623,887 | 11/1986 | Welles, II | 340/825 |
| 4,808,992 | 2/1989 | Beyers, Jr. et al. | 340/825.24 |
| 4,907,085 | 3/1990 | Bingham | 348/706 |
| 4,949,179 | 8/1990 | Hosono | 348/565 |
| 5,194,954 | 3/1993 | Duffield | 348/731 |
| 5,204,662 | 4/1993 | Oda et al. | 340/825.25 |
| 5,291,393 | 3/1994 | Goto | 348/734 X |

*Primary Examiner*—Victor R. Kostak
*Attorney, Agent, or Firm*—Ronald P. Kananen

[57] ABSTRACT

A remote control system comprises an audio apparatus audio signal, a video apparatus, a remote input device, a selector, and an output device wherein the remote input device transmits a position specification signal to the selector. The selector is connected to the audio and video apparatus and receives the position specification signal from the remote input device. The memory portion stores picture data include mode setting data for setting operation modes of the audio and video apparatus, command codes associated with the operation modes, and selection picture data for selecting the audio apparatus or Video apparatus. When the control portion detects that the position specification signal input by the remote input device indicates a predetermined position, it reads picture data in accordance with the input position specification signal from the memory portion. The command generation portion then selectively supplies a command code to the audio apparatus or video apparatus in accordance with the input position specification signal. The output device has a display portion to which the picture data read by the control portion from the memory portion are supplied, and the output signal of either the audio apparatus or video apparatus selected by the selector is supplied to the output device. When the control portion of the selector detects that the position specification signal input by the remote input device is a signal indicating the position corresponding to any one of the four sides of the display portion with the picture data of either the audio apparatus or video apparatus displayed on the display device, either the picture data associated with the other apparatus or the selection picture data are read from the memory portion and are displayed on said display portion.

15 Claims, 22 Drawing Sheets

5,416,535

REMOTE CONTROL SYSTEM AND CONTROL METHOD

BACKGROUND OF THE INVENTION

1. Field of the Invention

The present invention relates to a remote control system and the control method thereof and, more particularly, to a remote control system for performing remote control with reference to a display screen and the control method thereof.

2. Description of the Related Art

It has recently become possible to perform remote control of audio-visual apparatus such as VTR's, television receivers and compact disk players as well as various electronic apparatus such as air conditioners and lighting apparatus using a remote commander.

It is inconvenient for a use to have remote commanders to be exclusively used for respective apparatus. In order solve this, some remote commanders are provided with a learning function to store various command codes so that a single remote commander can control several kinds of electronic apparatus. For example, refer to U.S. Pat. No. 4,623,887.

However, as the contents of control become diverse as a result of the improvements in the functions of apparatus, remote commanders must have more control keys. In addition, if the learning function is employed, the number of control keys required is further increased so that a plurality of apparatus can be handled. Thus, remote commanders have been provided with a number of control keys, which have resulted in a problem that operations have become difficult, instead, because of reasons such as the difficulty in finding the control keys to be pushed to perform a certain operation.

Further, one must operate control keys while looking at the remote commander in operation in order to distinguish many control keys on it. This has been inconvenient because, for example, it has been difficult to operate a remote commander without looking at it while watching a television screen instead.

SUMMARY OF THE INVENTION

It is, therefore, an object of the present invention to provide a remote control system which resolves the above-mentioned problems.

It is another object of the present invention to provide a control method for a remote control system which resolves the above-mentioned problems.

According to the present invention, there is provided a remote control system including an operation input device, a receiver, a memory, a display controller, a command generator, and a transmitter. The operation input device outputs position specification information through line or radio transmission in response to operations. The receiver receives the position specification information transmitted by the operation input device. The memory stores various command codes which are divided into a plurality of groups. The display controller displays control pictures corresponding to the command codes stored in the memory on a group basis according to the position specification information received by the receiver while displays a position specification picture indicating one of the control pictures displayed. The command generator reads the command code corresponding to the control picture specified by the position specification picture according to the position specification information received by the receiver from the memory and outputs the same. The receiver transmits the command code output by the command generator to an apparatus or portion to be controlled on through line or radio transmission. When the position specification picture is moved to an end area which is set to be a part or the whole of the end portion surrounding the pictures on the display screen according to the position specification information received by the receiver while a group of control pictures are displayed, the display controller switches the display of the control pictures to a predetermined group of control pictures which are different from the group of control pictures being currently displayed.

According to the present invention, there is provided a control method for a remote control system. The remote control system controlled in accordance with the control method comprises a remote input device for transmitting a position specification signal, a memory for storing a plurality of picture data constituted by a plurality of mode setting data for setting the operation modes of a plurality of apparatus to be controlled and a plurality of command codes corresponding the picture data, and a controller which is supplied with the position specification signal from a remote control means and which reads the picture data corresponding to the position specification signal supplied from the memory, displays the picture data on a display means and reads the command code corresponding to the position specification signal supplied from the memory and supplies it to an apparatus to be controlled. According to this control method, with picture data read from the memory displayed on the display, the controller reads a command code from the memory in accordance with the position specification signal corresponding to mode setting data input by the remote input device and supplies it to an apparatus to be controlled; when the controller detects that the position specification signal input from the remote input device is a signal corresponding to a predetermined position, it reads the picture data corresponding to the position specification signal input from the remote input device from the memory, displays the picture data newly read from the memory instead of the picture data currently displayed on the display device, and supplies the command code to a plurality of apparatus.

The present invention makes it possible to obtain a remote control system having very high operability. According to the present invention, the number of control keys on a remote commander as a remote input device can be greatly reduced and it is possible to switch the operations of a plurality of apparatus or a plurality of kinds of apparatus. As a result, operations to be performed by a user can be simplified making him or her free from mistakes in operating keys on the remote commander or complications in operation. Further, since operations can be performed using a remote commander with one's eyes on a display portion as an output device, it is not necessary to confirm the keys on the remote commander for each operation and operability is thus improved. To switch the control picture corresponding to an apparatus to be controlled displayed on the display portion, it is necessary only to move the position specification signal from the remote commander indicated by a pointer or the like on the display portion to an end of the display portion. This makes operations easy to understand and carry out.

DESCRIPTION OF THE INVENTION

Remote control systems according to the present invention will now be described in detail with reference to the accompanying drawings.

A first embodiment of the present invention will be described.

Figure 1:
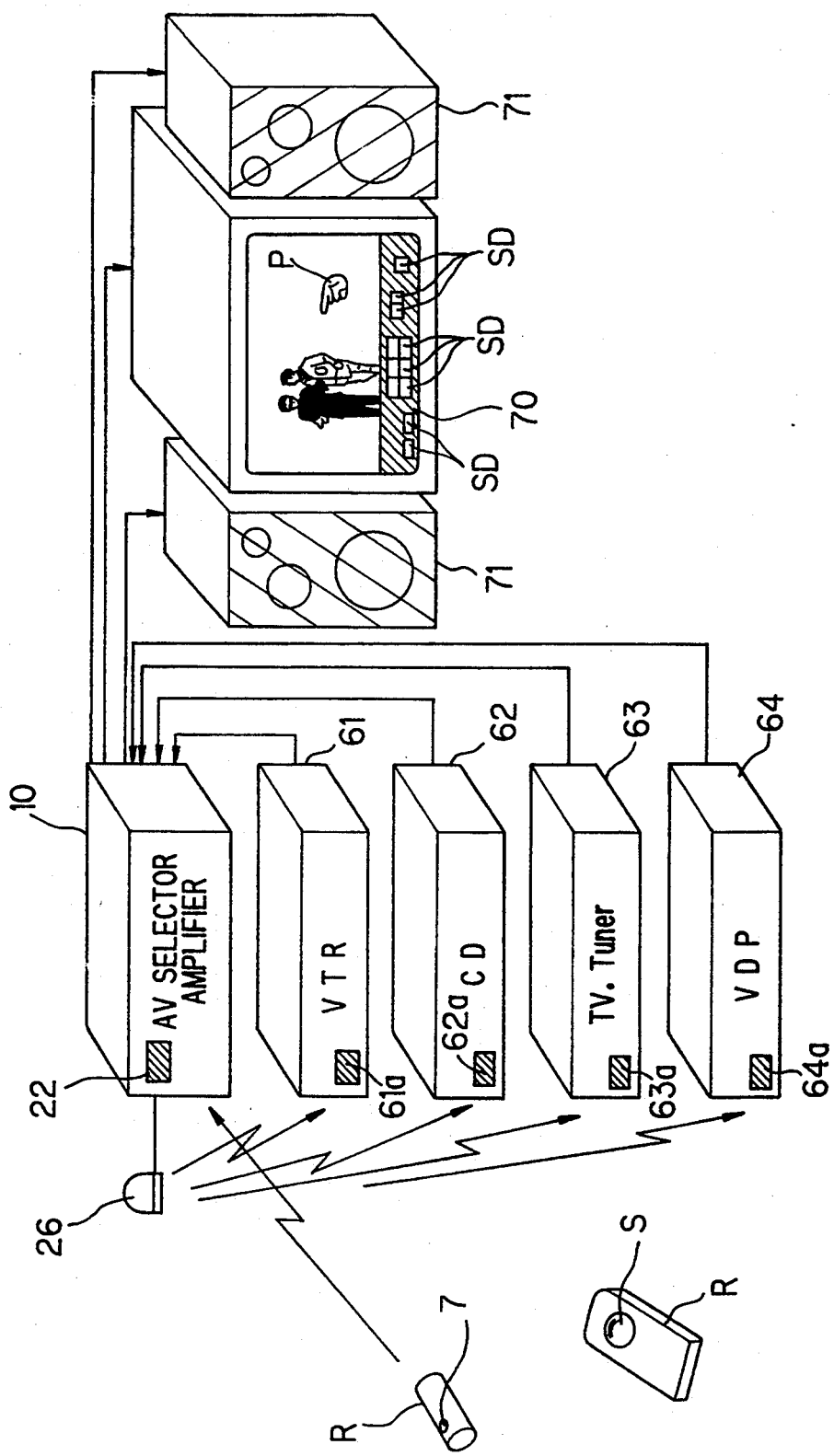
FIG. 1 illustrates the configuration of an audio-visual system wherein an embodiment of the present invention is employed.
Figure 2:
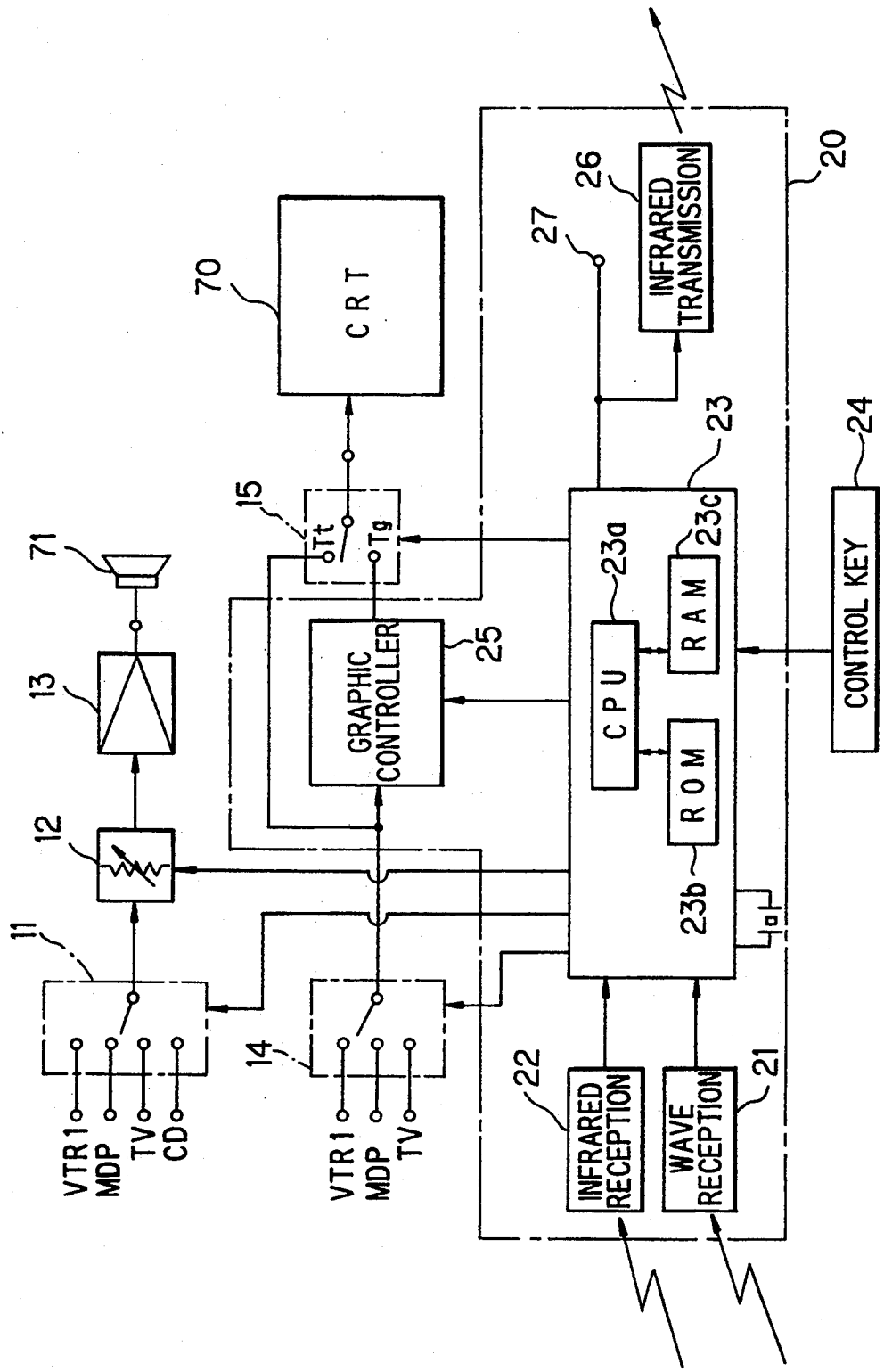
FIG. 2 illustrates the configuration of a position specification input handling portion of a remote control system of an embodiment of the present invention.

FIG. 1 and FIG. 2 show the configuration of a remote control System according the present embodiment. FIG. 1 illustrates an audio-visual system wherein the remote control system according to the present invention is employed. FIG. 2 is a block diagram for the remote control system.

In FIG. 1, reference numeral 10 designates an audio-visual selector amplifier (hereinafter referred to as an AV selector amplifier); 61 designates a video tape recorder (hereinafter referred to as a VTR); 62 designates a compact disk player (hereinafter referred to as a CD player); 63 designates a television tuner (hereinafter referred to as a TV tuner); 64 designates a video disk player (hereinafter referred to as a VDP); 70 designates a monitor device: and 71 designates a speaker.

Audio-visual signal outputs of the VTR 61, CD player 62, TV tuner 63, and VDP 64 are connected to the AV selector amplifier 10. Connections are provided so that the audio and visual signals selected by the AV selector amplifier 10 are output from the monitor device 70 and the speaker 71. The VTR 61, CD player 62, TV tuner 63, and VDP 64 are equipped with infrared receiving portions 61a, 62a, 63a, and 64a, respectively, and can normally be remote-controlled by infrared command signals output by remote commanders to be exclusively used by the respective apparatus. In the present embodiment, however, those apparatus can be controlled with a single remote commander R.

The remote control system which is the first embodiment of the present invention is constituted by the remote commander R and a position specification input handling portion (illustrated in FIG. 2) incorporated in the AV selector amplifier 10. As the remote commander R, those capable of outputting only the information of position changes on x and y coordinates and "enter" information will be sufficient. Further, devices usable as the remote commander R include those having only a shuttle ball S as an operating portion as shown, those capable of outputting position change information obtained by an angular velocity sensor, an acceleration sensor or the like, those capable of outputting rotation information such as mices for personal computers, those capable of outputting the information of the direction in which a joy stick is operated, and those having direction keys for four, eight or other number of directions. Any of infrared, radio, and wire signal transmission systems may be used.

For example, in the case of a remote commander R utilizing a shuttle ball S, it outputs the information of position changes in x and y directions as, for example, infrared modulation signals when a user rotates the shuttle ball S. It is further adapted to output "enter" information when the shuttle ball S is urged against something.

Figure 3:
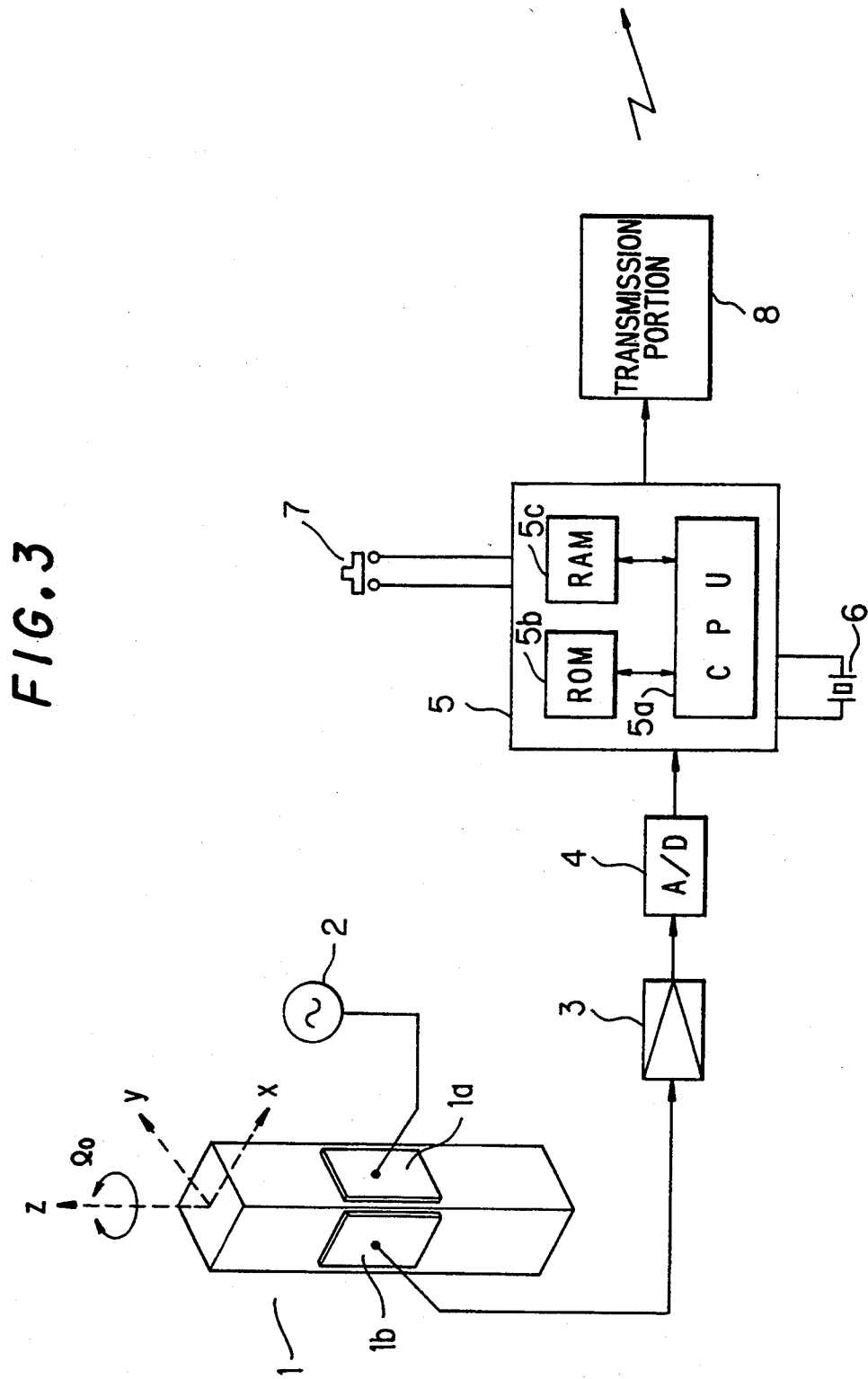
FIG. 3 illustrates a remote commander having an angular velocity sensor of an embodiment of the present invention.

A remote commander R utilizing an angular velocity sensor has a configuration, for example, as illustrated in FIG. 3 through FIG. 6. FIG. 3 is a block diagram showing the internal configuration of a remote commander R utilizing an angular velocity sensor, and 1 designates an oscillation gyroscope as the angular velocity sensor.

An oscillation gyroscope is characterized by a Coriolis force produced in a direction normal to the oscillation of a substance when an angular velocity is applied to the substance. The Coriolis force F is expressed as follows.

$$F = 2mv\omega$$

where m, v and $\omega$ represent mass, velocity and angular velocity, respectively. Therefore, the angular velocity $\omega$ is proportionate to the Coriolis force F and the angular velocity can be detected by detecting the Coriolis force F.

A driving piezoelectric ceramic element 1a and a detecting piezoelectric ceramic element 1b are mounted to the oscillation gyroscope 1. An alternating signal which is the oscillation output of an oscillator 2 is applied to the driving piezoelectric ceramic element 1a. When the oscillation gyroscope 1 is rotated in an $\Omega_0$ direction in this state, the Coriolis force F is applied to the detecting piezoelectric ceramic element 1b to generate a voltage E.

The very low voltage obtained from the detecting piezoelectric ceramic element 1b is amplified by an amplifier 3 and is supplied to an A–D converter 4 to be converted into digital data.

Reference numeral 5 designates a control portion constituted by a microcomputer having a CPU 5a, a ROM 5b, and a RAM 5c and the ROM 5b or RAM 5c stores command signals to be transmitted. Reference numeral 6 designates a clock generator. The ROM 5b stores in advance command signals for remotely controlling at least one of the above-mentioned VTR 61, CD player 62, TV tuner 63, and VDP 64. In the RAM 5c, command signals for remotely controlling other apparatus which are not stored in the ROM 5b are registered and stored by a user as in the above-mentioned U.S. Pat. No. 4,623,887. The RAM 5c may be a card-type medium incorporating a RAM to provide replaceability.

Figure 4:
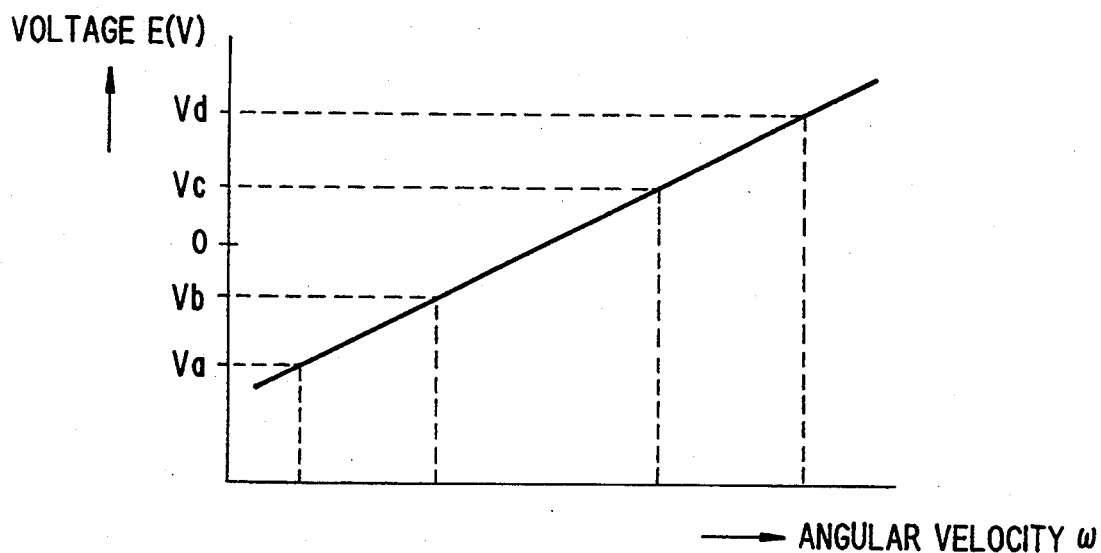
FIG. 4 illustrates an angular velocity detecting operation of a remote commander of an embodiment of the present invention.
Figure 5:
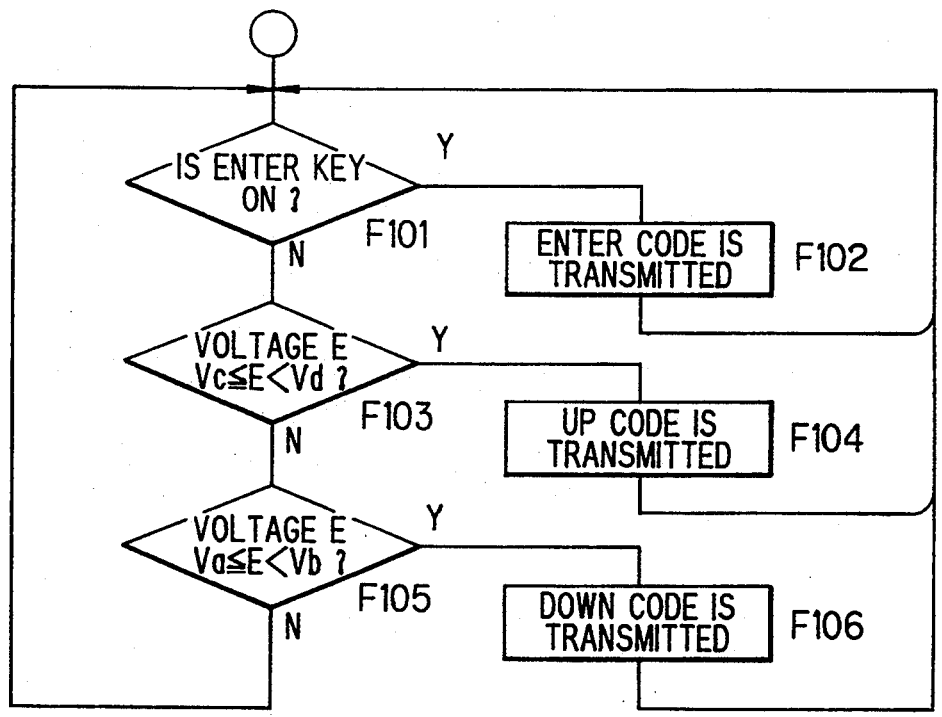
FIG. 5 is a flow chart for an angular velocity detecting operation of a remote commander of an embodiment of the present invention.

Reference numeral 7 designates an enter key which is, for example, provided on the remote commander R as a control key as shown in FIG. 4. The information of operations on the enter key 7 is supplied to the control portion 5.

In response to the operations on the enter key 7, the control portion 5 reads an enter command from the ROM 5b or RAM 5c and outputs it to a transmission portion 8.

The control portion 5 reads an up command or down command from the ROM 5b or RAM 5c in accordance with the digital data for the voltage E input by the A–D converter 4 and supplies it to the transmission portion 8. The angular velocity $\omega$ applied to the oscillation gyroscope 1 and the voltage E produced are proportionate to each other as shown in FIG. 4. The control portion 5 can output a command code which depends on the operation performed by the user on the remote commander R by, for example, comparing the input voltage E (digital data) with voltages Va, Vb, Vc, and Vd.

For example, suppose that the oscillation gyroscope 1 is disposed in the remote commander R so that the voltage E is increased due to the angular velocity at which the remote commander R is swung upward and the voltage E is decreased due to the angular velocity at which it is swung downward. Then, the control portion 5 determines the command code to be generated, for example, in accordance with the flow chart in FIG. 5

When the enter key 7 is pushed, the enter command is unconditionally generated (F101 and F102). Otherwise, the input voltage E (digital data) is compared with the voltages Va, Vb, Vc, and Vd. If $Vc < E < Vd$, i.e., if the remote commander R is swung upward, the up command is read from the ROM 5b or RAM 5c (F103 and F104). If $Va < E < Vb$, i.e., if the remote commander R is swung downward, the down command is read out (F105 and F106). If the voltage E input to the control portion 5 satisfies $Vb \leq E \leq Vc$, no command code is generated. This is to provide a dead zone to prevent any command code from being output when the remote commander R is very lightly touched or carried around by the user.

A command code thus generated by the control portion 5 is subjected to a predetermined modulation process at the transmission portion 8 and is output to a predetermined apparatus as an infrared signal or radio wave.

Figure 6:
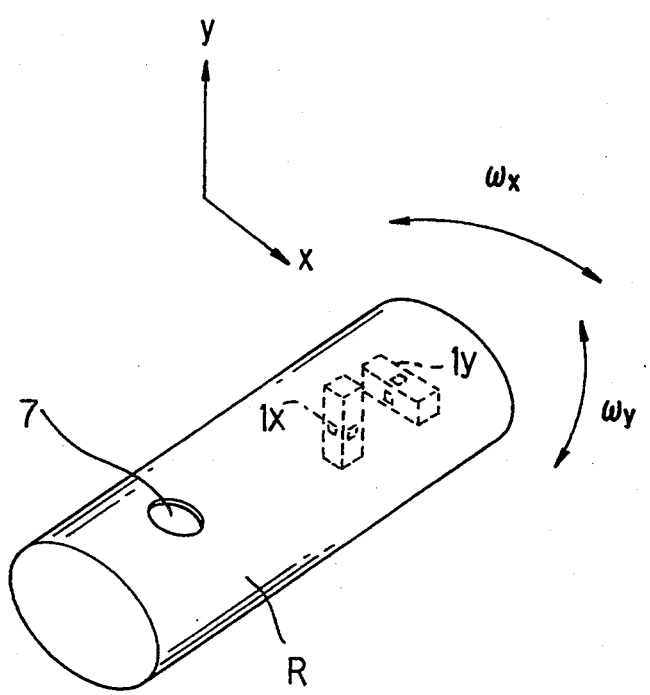
FIG. 6 illustrates a remote commander of an embodiment of the present invention.

Therefore, in the remote commander R of the remote control system of the present embodiment, two units of the oscillation gyroscope 1 (1x and 1y) are provided in orthogonal directions as shown in FIG. 6 as movement information (angular velocity) detecting means for the vertical direction x and the horizontal direction y. The oscillation gyroscopes 1x and 1y ; detect the angular velocity $\omega_x$ at which the remote commander; is swung to the left or right to output a leftward movement command or a rightward movement command (i.e., the information of a position change in x-direction) and detects the angular velocity $\omega_y$ at which the remote commander R is swung upward or downward to output an up command or a down command (i.e., the information of a position change in y-direction).

FIG. 2 shows a position specification input handling portion provided in the AV selector amplifier 10 which constitutes the remote control system of the present embodiment by being adapted to the remote commander R which is equipped with the shuttle ball as described above, a track ball, a jog shuttle, x and y angular velocity sensors or the like to be capable of outputting position change information.

In FIG. 2, 11 reference numeral input selector portion which selects one input audio signal from among audio signals supplied by the VTR 61, CD player 62, TV tuner 63, and VDP 64 connected as external apparatus.

The audio signal selected by the audio input selector portion 11 is supplied through a volume adjusting portion 12 to an amplifier 13 to be amplified and is in turn supplied to a speaker 71 connected thereto to be output as a sound.

Reference numeral 14 video input selector portion which selects one input video signal from among video signals supplied by the VTR 61, CD player 62, and TV tuner 63 connected as external apparatus.

The video signal selected by the video input selector portion 14 is supplied through a video switching portion 15 to the monitor device 70 connected as a display device and is output as a picture.

In addition to the above-described portions which perform the functions of the AV selector amplifier, a position specification input handling portion 20 is provided, which handles command codes constituting the position specification information (x-y position change information and "enter" information) transmitted by the remote commander R.

Reference numeral 21 designates a radio wave receiving portion for receiving and demodulating the command codes radio-transmitted by the remote commander R. Reference numeral 22 designates an infrared receiving portion for receiving and demodulating the command codes transmitted using infrared rays. Of course, it is sufficient to provide only either of them depending on the transmission system employed in the remote commander R. They are not necessary in the case of wire transmission. Hereinafter, the remote commander R of the present embodiment will be described as outputting the position specification information as infrared modulation signals.

Reference numeral 23 designates a control portion constituted by a microcomputer having a CPU 23a, a ROM 23b, and a RAM 23c. As described later, the control portion 23 performs control functions of various remote control systems in accordance with the operation information of the remote commander R supplied by the infrared receiving portion 22 and it further functions as a control portion for the AV selector amplifier. Specifically, it performs control on the switching operations of the audio input selector portion 11 and the video input selector portion 14, volume control on the volume adjusting portion 11, and control on the switching operations of the video switching portion 15 and the like in accordance with the input of the operations performed by a user.

Reference numeral 24 designates a panel operation portion on which various control keys are provided. Operation information from the panel operation portion 24 are supplied to the control portion 23. The panel operation portion 24 is provided with a function switching key for causing the control portion 23 to control the switching operations of the audio input selector 14, a video switching key for controlling the switching operations of the video switching portion 15, a volume control key, and the like.

Reference numeral 25 designates a graphic controller which generates predetermined character picture signals in accordance with instructions from the controller 23. A character picture signal is, for example, superimposed on a video signal selected by the video input selector portion 14 and is supplied through the video switching portion 15 to a CRT display portion 16. As the contents of character pictures to be displayed, there are provided as shown in FIG. 1 control pictures SD indicating the control of various apparatus and the picture of a finger or an arrow (hereinafter referred to as pointer P) for selecting a indicating a certain control picture SD from among control the various pictures SD displayed on the CRT. For example, a plurality of control pictures SD are displayed on one screen but the control pictures SD displayed are divided into groups each associated with an apparatus. For example, control pictures SD for reproduction, picture recording, stopping, fast-forwarding, rewinding and the like are set as the group of control pictures SD for the VTR 61 and they are simultaneously displayed.

The pointer P as the position specification picture may be substituted by a cursor, a frame moving about control pictures, or a system wherein only the specified control picture changes its color.

The ROM 23b or the RAM 23c of the control portion 23 stores control data for the above mentioned portions performing the functions of the AV selector amplifier and various command codes for the electronic apparatus such as the VTR 61 connected to the AV selector amplifier and other external electronic apparatus bearing no relation to the AV selector amplifier at all. When one of such command codes is specified through an operation on the remote commander R performed by the user as will be described later, the command code is read out and supplied to the infrared transmission portion 26. The read command code is also supplied to a terminal 27 which in turn supplies it to a predetermined external apparatus or an internal circuit system through wire-transmission. If a system bus line is established between the apparatus, the command may be transmitted over the bus.

The infrared transmission portion 26 performs a predetermined modulation process on the command code thus supplied and transmits it to the outside as an infrared signal. The infrared transmission portion 26 is provided, for example, as a non-directional infrared output unit as shown in FIG. 1. Therefore, an infrared signal output by the infrared transmission portion 26 can be received by an infrared receiving portion of each of the electronic apparatus such as the VTR 61 disposed around the AV selector amplifier.

A radio-type command code transmission portion may be provided instead of or in combination with the infrared transmission portion.

The operation of the remote control system having such a configuration will now be described with reference to FIG. 7 through FIG. 17.

Figure 7:
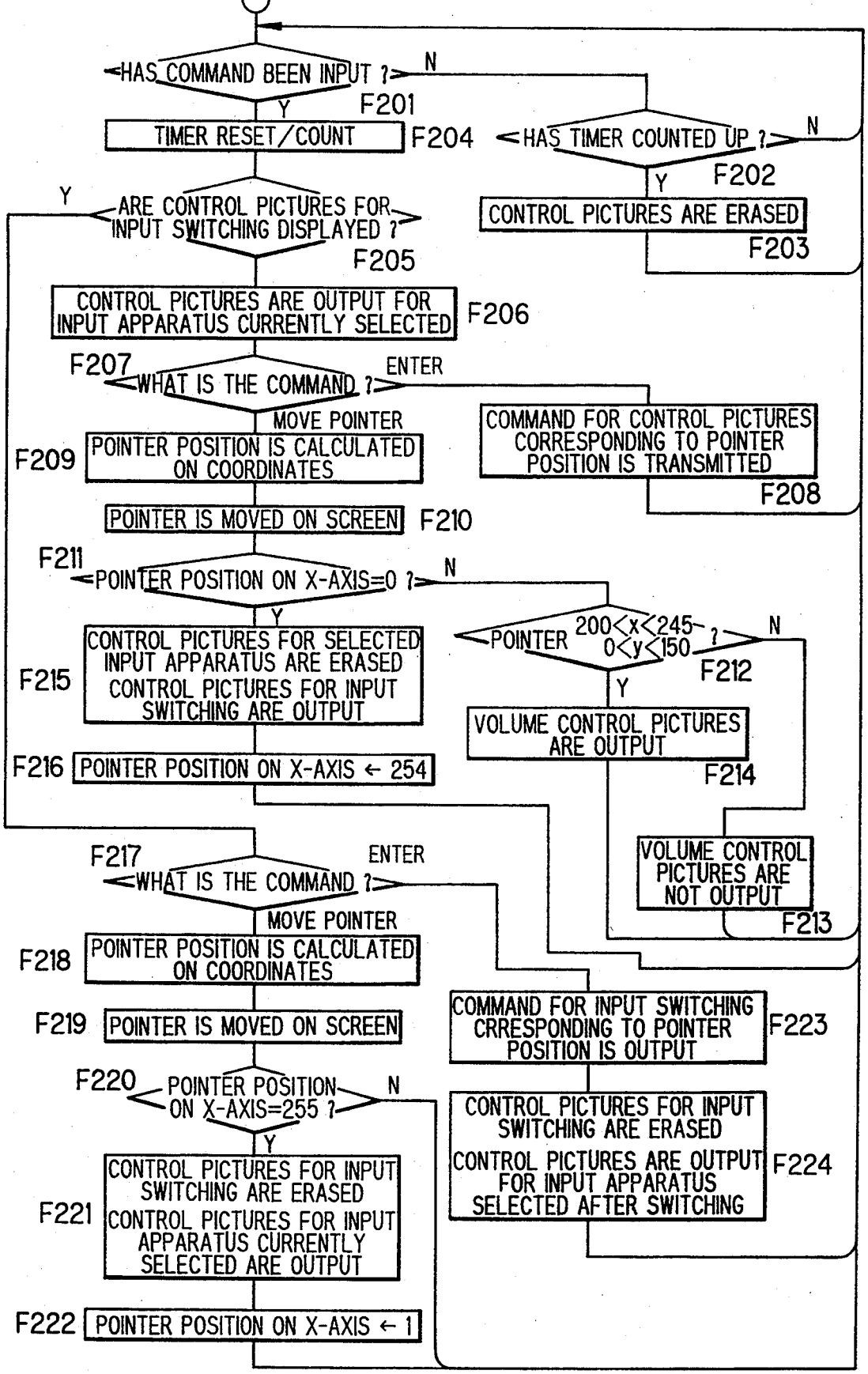
FIG. 7 is a flow chart for remote control operations in a first embodiment of the present invention.
Figure 8:
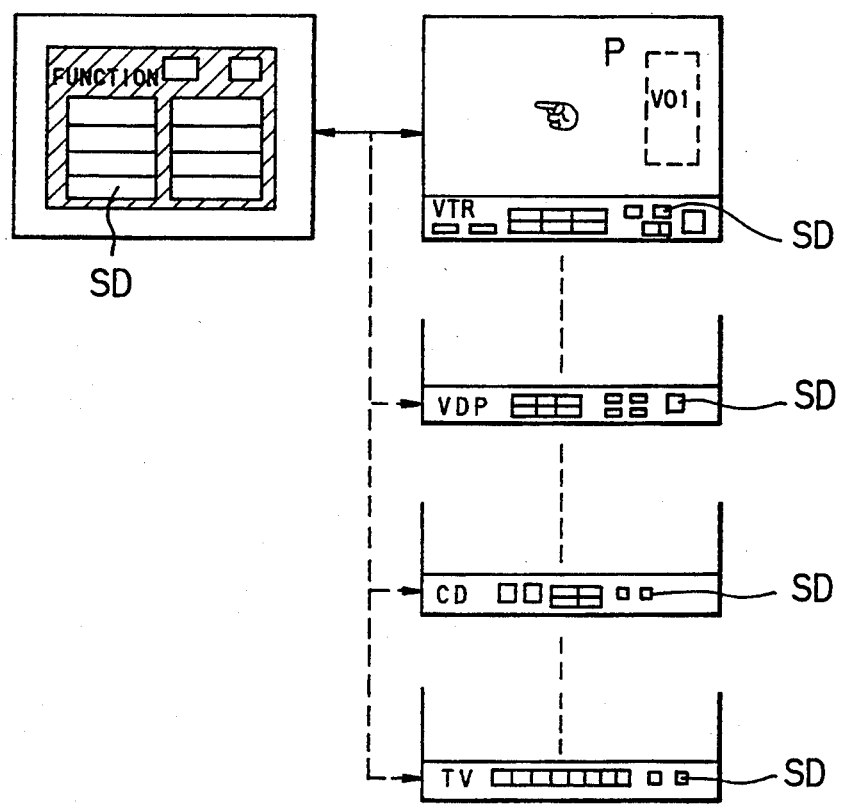
FIG. 8 illustrates display operations of the first embodiment of the present invention.

FIG. 7 is a flow chart showing the process performed by the control portion 32 in accordance with the position specification information (x-y position change information and "enter" information) transmitted by the remote commander R. FIG. 8 conceptually shows the switching of display between the control pictures SD for controlling various apparatus.

As described above, the ROM 23b or ROM 23c stores command codes for performing various operations on various apparatus. The corresponding control pictures are divided into groups each associated with one of the apparatus. For the purpose of explanation, in the present embodiment, the monitor device 70 switchably displays various control pictures corresponding to various command codes such as reproduction, stop, and picture recording command codes to VTR 61, various control pictures corresponding to various command codes such as reproduction and stop command codes to the CD player 62, various control pictures corresponding to command codes such as a channel switch command code to the TV tuner 63. various control pictures corresponding to various command codes such as reproduction and stop command codes to the VDP 64, and various control pictures corresponding to various command codes such as input switching and volume command codes to the AV selector amplifier.

According to the operation of the first embodiment to be described below, control on the apparatus currently selected by the AV selector amplifier 10 as the input can be easily performed. As the control pictures SD for the first embodiment, the group of control pictures SD associated with the apparatus currently selected as the input are displayed. For example, if the VTR is selected by the audio input selector portion 11 and the video input selector portion 14, the control pictures SD associated with the operations of the VTR are displayed. The pointer P is moved in accordance with x-y position change information from the remote commander R until it points to a certain control picture SD, e.g., "VTR reproduction" where the "enter" command is supplied from the remote commander R. At this time, a command code "VTR reproduction" corresponding to the control picture entered is read from the ROM 23b or the RAM 23c and is output from the infrared transmission portion 26.

If the pointer P is moved to the left end of the screen by operating the remote commander R, the group of control pictures SD is switched to a group of control pictures SD for an input switching operation to are then displayed to allow the input switching operation to be performed. Further, when the pointer P enters a certain area on the screen, certain control pictures are displayed to allow associated control to be performed. The operation performed when control information is input from the remote commander R will now be described with reference to the flow chart in FIG. 7.

Figure 11:
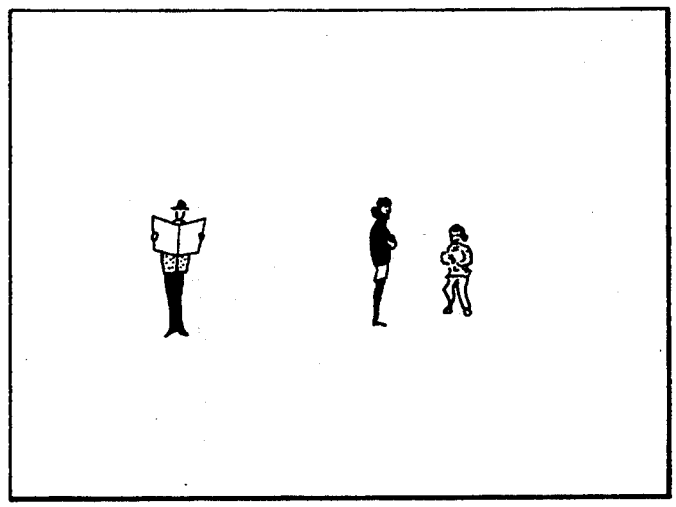
FIG. 11 illustrates an example of screen display according to an embodiment of the present invention.

Suppose that the AV selector amplifier 10 has initially selected the VTR 61 as the input and a reproduction signal from the VTR 61 has been supplied to the monitor device 70 as a video signal to display the picture shown in FIG. 11.

Figure 12:
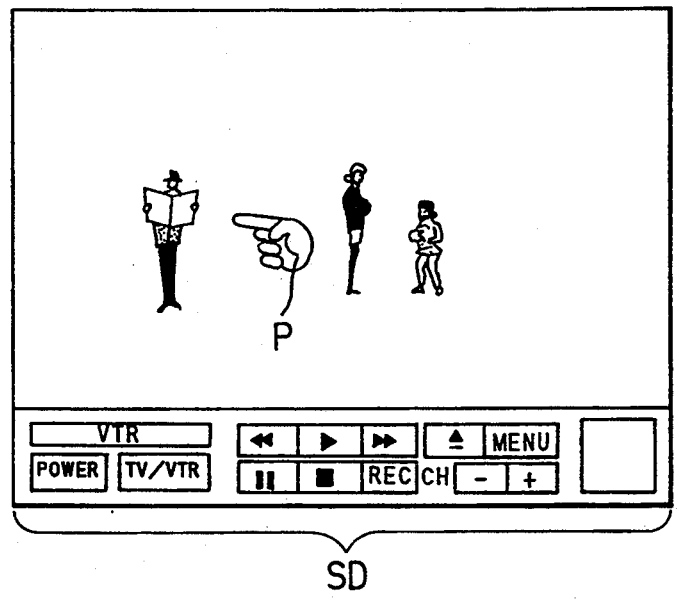
FIG. 12 illustrates an example of the screen display of a pointer and control pictures according to an embodiment of the present invention.

For example, if the user operates the remote commander R to transmit a certain command code which is fetched into the control portion 23 from the infrared receiving portion 22, the control portion 23 controls the video switching portion 15 so that switching from 2a terminal Tt to a terminal Tg takes place. Consequently, as the output of the graphic controller 25, a picture signal from the video input selector portion 14 along with a predetermined character picture superimposed thereon is supplied to the monitor device 70 and, for example, the pointer P and the control pictures SD associated with the R 61 are displayed as shown in FIG. 12.

As shown in FIG. 7, upon the input of a command code (F201), the control portion 23 resets a timer to start time measurement (F204) and causes the control pictures SD associated with the apparatus currently selected as the input to be displayed (F206). Specifically, it instructs the graphic controller 25 of the data to be displayed.

The measurement of time at step F204 is for erasing the control pictures SD and the pointer P when they are not necessary, According to this time measurement, the control pictures SD and the pointer P are erased if no command is transmitted for a predetermined period of time after the command most recently transmitted from the remote commander R (F202 and F203). In other words, this is a process to avoid complication due to the control pictures SD and pointer P remaining on the screen unecessarily.

Next, it is determined which command code has been input, the "enter" command or the x-y position change information (F207). If the "enter" command has been input, the command code corresponding to the control picture indicated by the position of the pointer P at that point in time is read from the ROM 23b or the RAM 23c to be transmitted (F208). On the other hand, if the x-y position change information has been input, the pointer P is moved on the screen accordingly (F209 and F210).

Figure 13:
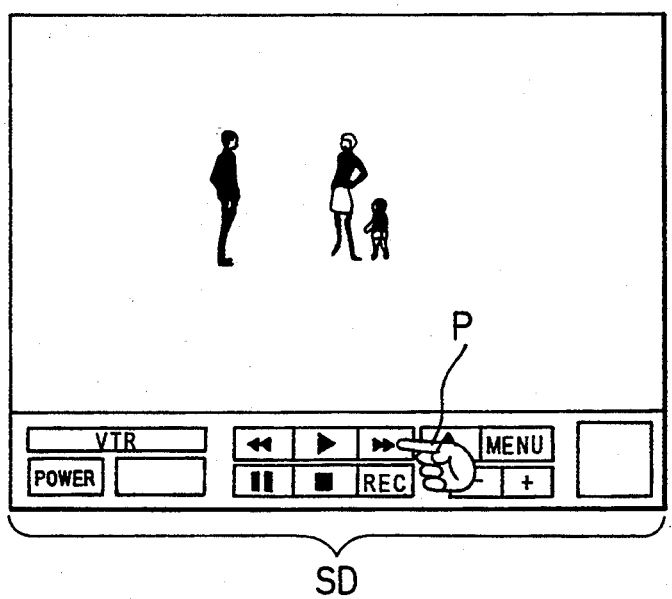
FIG. 13 illustrates an example of the screen display of a state wherein a control picture is specified with a pointer according to an embodiment of the present invention.

For example, the control pictures for causing the VTR 61 to perform operations such as rewinding, reproduction, fast-forwarding, stopping, pausing and picture recording are displayed as the control pictures SD on the screen of the monitor device 70 as shown in FIG. 12. Thereafter, if the "enter" command is supplied from the remote commander R when the pointer P has been moved onto the "fast-forward" control picture SD as shown in FIG. 13, the control portion 23 transmits a "VTR fast-forward" command signal. This causes the infrared transmission portion 26 to output a transmission signal in accordance with the "VTR fast-forward" command signal which is received by the infrared receiving portion 61a of the VTR 61. The VTR 61 thus performs fast-forwarding.

If the x-y position change information is input, the pointer P is moved on the screen accordingly. Specifically, a new position for the pointer P is calculated (F209) and data are sent to the graphic controller 25 so that the pointer P is moved to the position calculated on the screen, realizing the movement on the display (F210).

Figure 9:
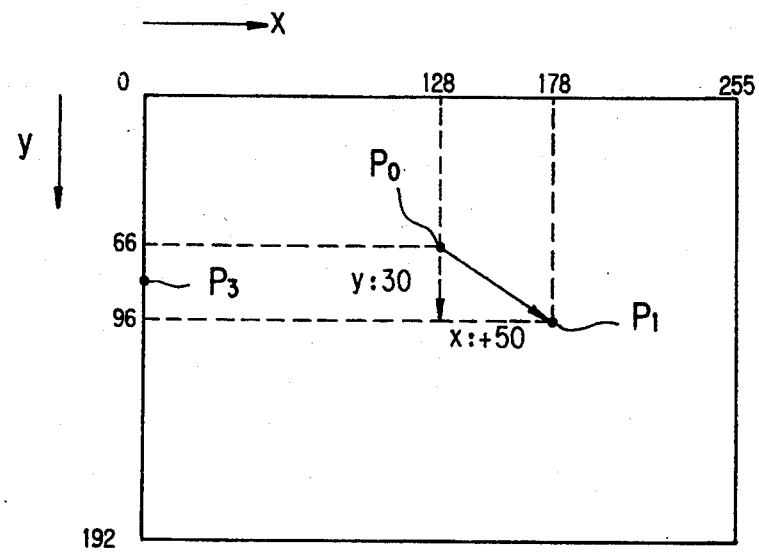
FIG. 9 illustrates the manner in which the coordinates of a pointer is managed according to an embodiment of the present invention.

For this purpose, the CPU 32a includes an x-y coordinate system corresponding to the screen of the monitor device 70. This allows determination of the position and action of the pointer P and its relationship to the control pictures SD. For example, a coordinate system having 255 dots in the x-direction and 192 dots in the y-direction is constructed as shown in FIG. 9 in correspondence to the display screen and a position $P_0$ for the pointer P is recognized as a value on the coordinate system. When x-y position change information is input, the coordinate value for the current position $P_0$ of the pointer P is added with the x-y position change information to calculate a new position for the pointer P.

For example, suppose that the current position $P_0$ of the pointer P is expressed as $(x,y)=(128,66)$ on the x-y coordinate system and the remote commander R sends numerical values $+50$ and $+30$ as position change information in the x-direction and position change information in the y-direction, respectively. Then, a new position $P_1$ is calculated for the pointer P as $(x,y)=(178, 96)$. This data is sent to the graphic controller 25 and the pointer P is moved on the screen to the position $P_1$. If the addition of x-y position change information results in $x<0$ or $x>255$, x is set to 0 or 255, respectively. If $y<0$ or $y>192$, y is set to 0 or 192, respectively.

When the "enter" command is input, the control picture SD whose position on the display coincides with the position of the pointer P is selected and the corresponding command is transmitted. According to this process, since the position in which each control picture SD is displayed is also recognized as a numerical value indicating an area on the x-y coordinate system in the CPU 23a, the selected control picture can be determined from the correspondence between those values on the coordinate system.

In the present embodiment, it is determined whether to display a new group of control pictures based on the position of the pointer P. Therefore, when the pointer is moved at steps F209 and F210, it is determined whether the x-coordinate value indicating the position of the pointer P is 0, i.e, whether the pointer P has been moved to the left end of the screen (F211).

Figure 10:
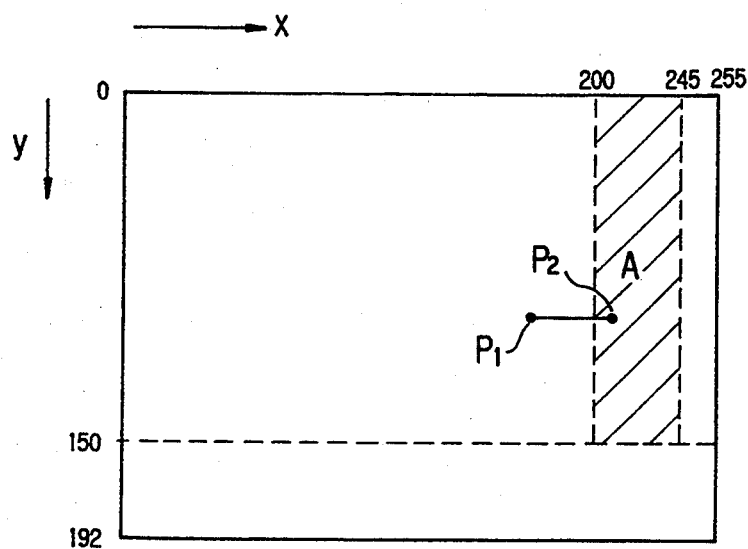
FIG. 10 illustrates the setting of a certain control area on coordinates.

If the pointer is not at the left end of the screen, the process proceeds to step F212 to determine whether the pointer P is, for example, in the range indicated as the area A in the x-y coordinate system in FIG. 10. For example, the area A is set as an area wherein $200<x<245$ and $0<y<150$.

Figure 14:
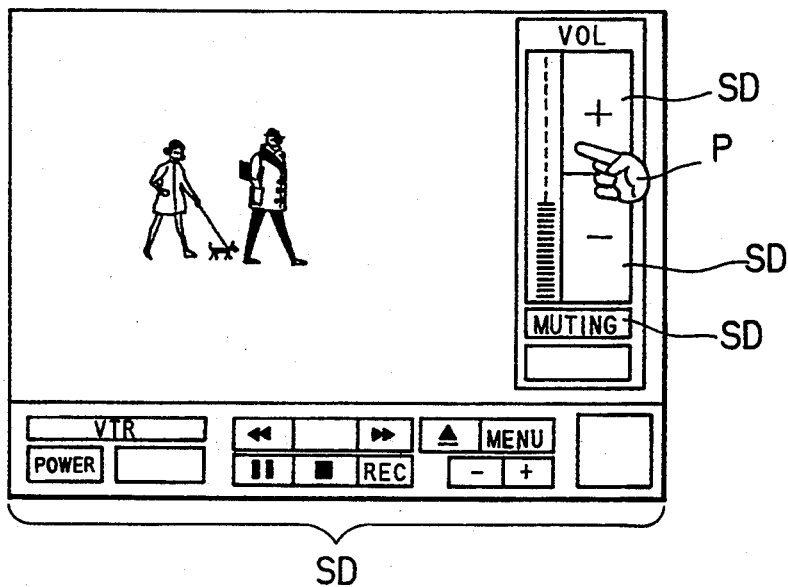
FIG. 14 illustrates an example of the display of control pictures wherein a certain control area is set according to an embodiment of the present invention.

If the pointer P is moved into the area A, the process proceeds from step F212 to step F214 to display the group of control pictures SD for volume adjustment as shown in FIG. 14. In other words, the control pictures indicating the operations of turning up and down the volume and muting are displayed on the monitor device 70.

For example if the "enter" command is input with the pointer P pointing to the control picture for turning up the volume as shown in FIG. 14 and the process thus proceeds to step F208, the control portion 23 transmits a "volume up" control signal to the volume adjusting portion 12.

When the pointer P no longer resides in the area A, the process proceeds from F212 to F213 to erase any volume control picture displayed (if no volume control picture is displayed, no process takes place) and returns to step F201. In other words, if the pointer P is moved out of the area A, the volume control pictures are erased and the display returns to, for example, the state as shown in FIG. 12.

For an operation carried out frequently like the volume adjusting operation, a special control area is set as described above. Operability can be significantly improved by causing the control pictures to be automatically displayed to be operable at the point in time when the pointer P enters the control area.

Figure 15:
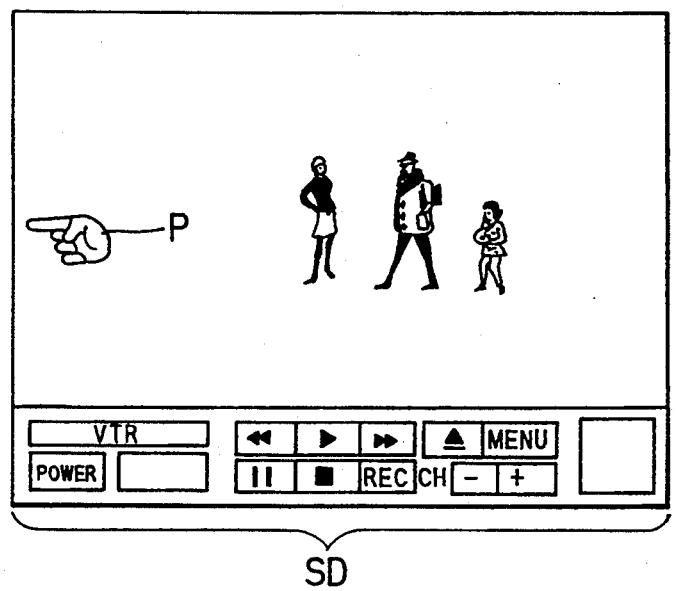
FIG. 15 illustrates an example of screen display wherein a pointer has been moved to the left end of a screen according to an embodiment of the present invention.
Figure 16:
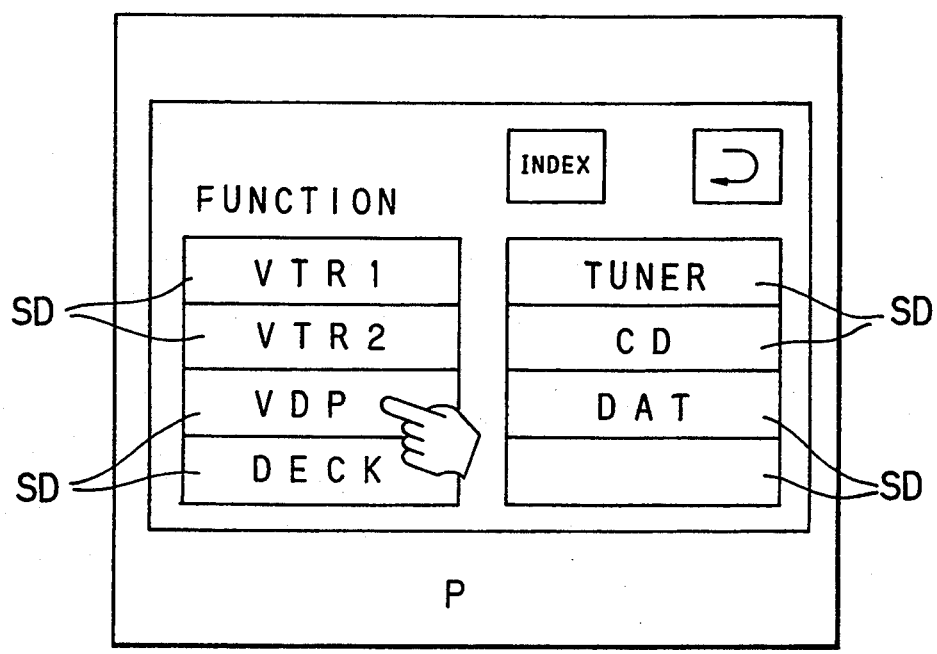
FIG. 16 illustrates an example of the screen display of control pictures for input switching according to an embodiment of the present invention.

When the pointer P is moved to the left end of the screen as shown in FIG. 15, i,e, when the coordinate value x=0 is reached as indicated as P3 in FIG. 9, the process proceeds from F211 to F215 to erase the control pictures for the VTR 61 which have been displayed until then. Then, the control pictures SD for input switching are displayed as shown in FIG. 16. It appears to the user operating the remote commander R that the another screen appears as the left page side of the current screen as the pointer P is moved fully to the left on the screen.

At this time, the x-coordinate value of the pointer P is changed from 0 to 254 so that the pointer P appears at the right end of the screen for input switching (F216).

While the screen for input switching is displayed as described above, the process proceeds from step F205 to step F217. As a command is input, the contents of the command is determined (F217). If it is x-y position change information, a new pointer position is calculated on the x-y coordinate system accordingly as previously described (F218) and the pointer P is moved to the new pointer position on the screen (F219). Then, it is determined whether the position of the pointer P on the x-coordinate equals 255 and, if not, the process proceeds to step F201 without any further action.

When the pointer is moved to reach the position on x-coordinate which equals 255 at step F220, i.e., when the pointer P is moved fully to the right end of the screen for controlling input switching, the screen for controlling input switching currently displayed is erased and the display is switched to the initial state, i.e., the state as shown in FIG. 15 wherein the control pictures SD for the apparatus currently selected as the input are displayed (F221). The value of x for the pointer position at this time is set to 1 so that the pointer P appears in the vicinity of the left end of the screen (F222). It appears to the user operating the remote commander R that the initial screen appears as the right page side of the screen as the pointer P is moved fully to the right on the screen.

If the enter operation is performed when the pointer P has been moved into, for example, the area where "VDP" is displayed on the screen in FIG. 16 showing the control pictures for the input switching operation, the control portion 23 performs the process at step F223 to output the command signal for input switching. Specifically, it controls the audio input selector portion 11 and the video input selector portion 14 so that they select the input terminals for the VDP.

Figure 17:
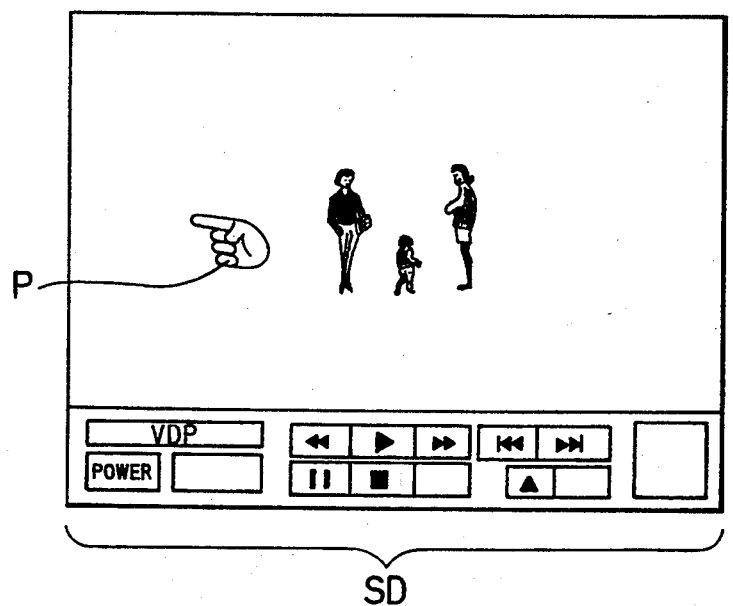
FIG. 17 illustrates an example of the screen display of a pointer and control pictures according to an embodiment of the present invention.

When the input switching has been performed as described above, the control pictures for controlling input switching are erased and the group of control pictures for the apparatus selected are displayed. In this case, therefore, the control pictures SD for the VDP 64 are displayed as shown in FIG. 17.

As a result of the above-described process shown in FIG. 7, the display for control is switched as conceptually shown in FIG. 8 and the user can control each apparatus by operating the remote commander R. Specifically, the user can control various apparatus only by operating the remote commander R to move the pointer P and by performing the enter operation in desired positions with his or her eyes on the screen of the monitor device 70. Thus, the remote commander R can be very easily operated. As a result, it is possible to avoid complication in operation due to a number of keys and inconvenience that the user has to turn his or her eyes from the monitor screen.

Especially, the control pictures for input switching can be called up by moving the pointer P fully to the left, which operation feels like turning a page of a book. Further, the initial control pictures can be called up by moving the pointer P fully to the right on the screen for the input switching, which operation feels like replacing the page. In other words, the end portions of two screens where those screens are called up each other, are positioned opposite to each other. For example, in a mode wherein the control pictures for the VTR or the like are displayed, the control pictures for input switching are called up at the left end of the screen while in the mode wherein the control pictures for input switching is displayed, control pictures for the VTR or the like are called up at the right end of the screen which is opposite to the above-described left end of the screen. This makes the operation easy to understand and eliminates the need for the enter operation or the like in switching the screens, thereby significantly improving operability.

In addition, it is not necessary to always keep a picture for specifying the switching of control pictures displayed on the screen and complicatedness associated with the display of such can be avoided.

A second embodiment of the present invention will now be described with reference to FIG. 18 and FIG. 19. This remote control system has the same configuration as that shown in FIG. 1 and FIG. 2 and the description of the same will therefore be omitted.

Figure 18:
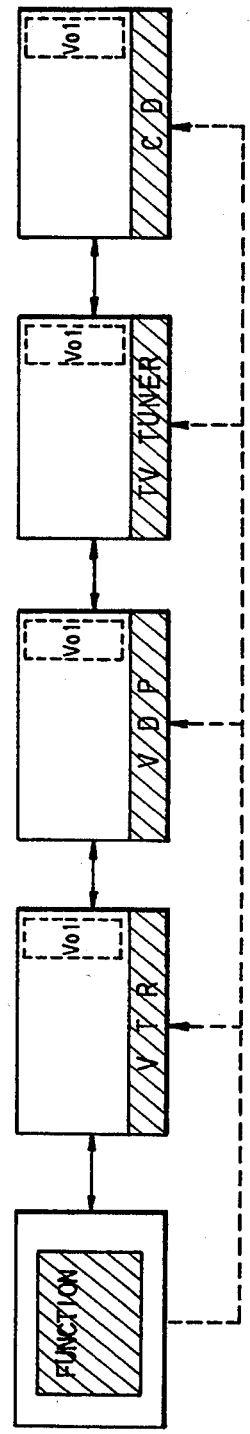
FIG. 18 illustrates display operations of a second embodiment of the present invention.
Figure 19:
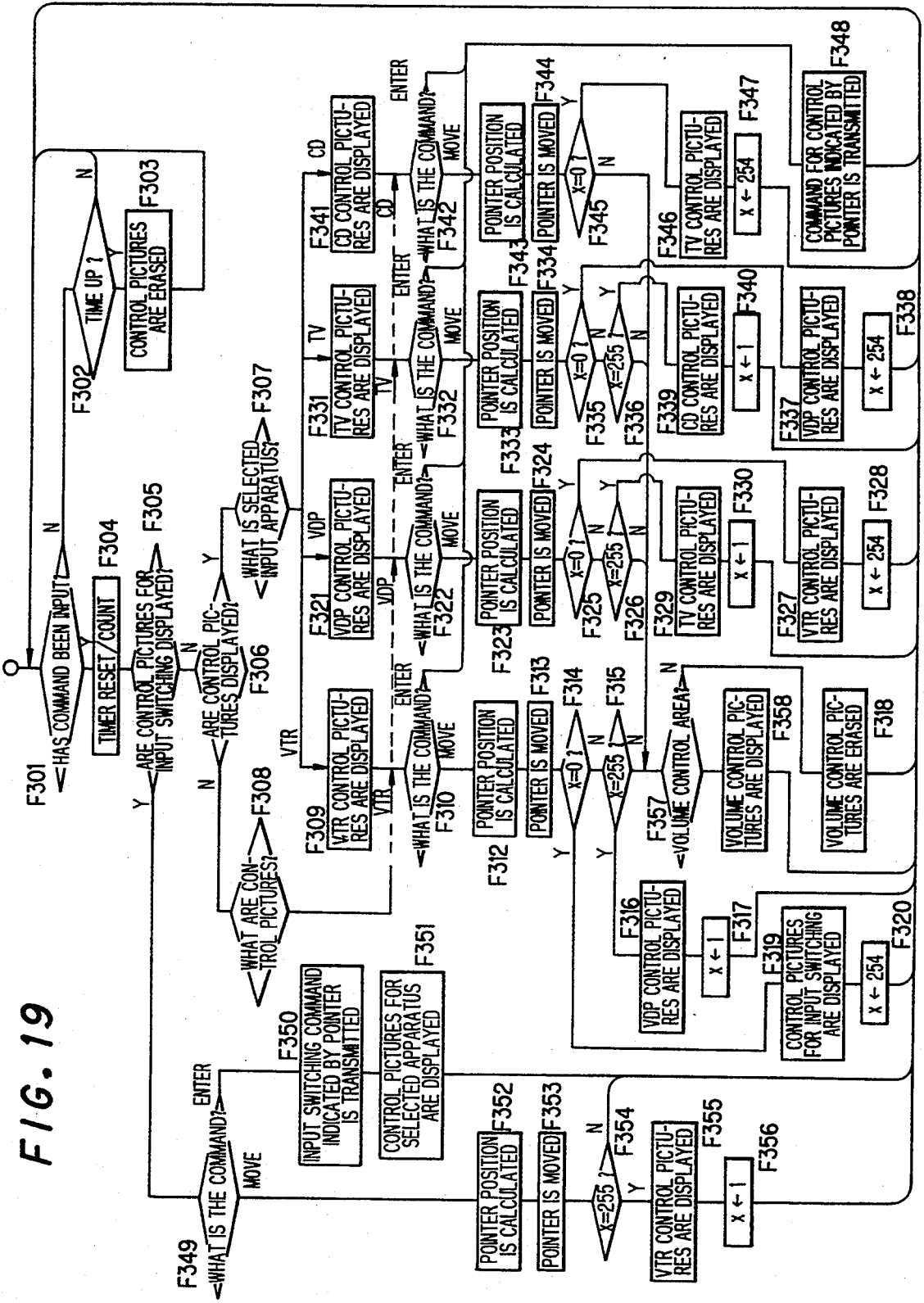
FIG. 19 is a flow chart for remote control operations of the second embodiment of the present invention.

FIG. 19 is a flow chart showing the process performed by the control portion 23 in accordance with position specification information (x-y position change information and "enter") transmitted by the remote commander R. FIG. 18 conceptually shows the operations of switching the display of control pictures SD for controlling various apparatus. In FIG. 18, the shaded areas represent a portion where the control pictures for those apparatus are displayed. The areas enclosed by the dotted lines represents an area wherein control pictures for volume control are displayed (they correspond to the area A in FIG. 10).

In the first embodiment, the switching between the display of the control pictures for the apparatus currently selected as the input and the display of the control pictures for input switching is performed in a manner that feels like turning a page of a book. In this second embodiment, the switching between the groups of control pictures for the respective apparatus takes place according to the relationships as represented by the moving directions of the pointer as indicated by the arrows in solid lines in FIG. 18.

Specifically, starting with the display of the control pictures for input switching, the switching of display takes place to show the control pictures for the VTR, the control pictures for the VDP, the control pictures for the TV tuner, and the control pictures for the CD player in the order listed each time the pointer P is moved fully to the right. Conversely, when started with the display of the control pictures for the CD player, the switching of display takes place to show the control pictures for the TV tuner, the control pictures for the VDP, the control pictures for the VTR, and the control pictures for input switching in the order listed each time the pointer P is moved fully to the left. FIG. 18 illustrates this situation as a virtual positional relationship.

As to volume control, in a mode wherein control pictures other than those for input switching are displayed, the control pictures for volume adjustment are displayed as the pointer P enters the area A shown in FIG. 10 to improve volume-controllability.

The processes at the control portion 23 to perform such display switching and command transmission operations in accordance of the specification of control pictures are illustrated with reference to FIG. 19.

Upon the input of any command code (F301) from the remote commander R, the control portion 23 resets the timer to start time measurement (F304) and, thereafter, determines whether the control pictures for input switching are currently displayed (F305).

The resetting and starting of the timer at step F304 are for erasing the control pictures SD and the pointer P when they are not necessary as in the first embodiment. The control pictures SD and the pointer P are erased if no command is transmitted for a predetermined period of time after the command most recently transmitted from the remote commander R (F302 and F303). This is a process to avoid complication due to the control pictures SD and pointer P remaining on the screen unnecessarily.

If the control pictures for input switching are not displayed, it is determined, for example, whether the display is in a state wherein no control picture is displayed as shown in FIG. 11 (F306). If the state of the display is as shown in FIG. 11, it is determined what is currently selected by the audio input selector portion 11 and the video input selector portion 14 (F307) and the process step to follow is decided depending on the status of input selection.

In the present embodiment, the process proceeds to step F309 if the VTR 61 has been selected as the input, to step F321 if the VDP 64 has been selected, to step F331 if the TV tuner 63 has been selected, and to step F331 if the CD player 62 has been selected. As a result, the monitor device 70 displays the group of control pictures for the VTR 61 (F309), the group of control pictures for the VDP 64 (F321), the group of control pictures for the TV tuner 63 (F331), or the group of control pictures for the CD player 62 (F341).

If any group of control pictures have already been displayed at step F306, depending on the group displayed, the process proceeds to step F310 if the control pictures for the VTR are displayed, to step, F322 if the control pictures for the VDP are displayed, to step F332 if the control pictures for the TV tuner are displayed, and to step F342 if the control pictures of the CD player are displayed.

Each of steps F310, F322, F332, and F342 determines the contents of commands. If a command is determined to be the "enter" command, the process proceeds from any of those steps to step F348 at which the command signal for the control pictures pointed by the pointer P when the "enter" command is input is read from a ROM 32b or RAM 32c to be transmitted from the infrared transmission portion 26 or the like.

If any of steps F310, F322, F332, and F342 of the respective modes wherein the respective groups are displayed determines the contents of a command as x-y position change information, a pointer moving process is entered. Specifically, a new pointer position is calculated on the coordinate system (F312, F323, F333, and F343). The calculated pointer position is transmitted to the graphic controller 25 to move the pointer P on the screen (F313, F324, F334, and F344).

If the pointer P enters the area A shown in FIG. 10 as a result of the movement of the pointer P, the control pictures for volume control are displayed as shown in FIG. 14 (F357 and F358) enabling volume control. If the pointer is out of the area A, the control pictures for volume control are not displayed (erased) (F357 and F318).

When the pointer P is moved to the left end of the screen, i,e, when the x-coordinate value of the pointer equals 0 with the control pictures for the VTR displayed, the control pictures for the VTR which have been displayed are erased and the control pictures for input switching are displayed as shown in FIG. 16 (F314 and F319). It appears to the user operating the remote commander R that moving the pointer P fully to the left on the screen on which control on the VTR can be performed, causes the screen on which control on input switching can be performed to appear as the left page side of the previous screen in accordance with the virtual positional relationship shown in FIG. 18. At this time, the x-coordinate value of the pointer P is changed from 0 to 254 so that the pointer P appears at the right end of the screen for input switching (F320).

When the pointer P is moved to the right end of the screen, i,e, when the x-coordinate value of the pointer equals 255 with the control pictures for the VTR similarly displayed, the control pictures for the VTR which have been displayed are erased and the control pictures for the VDP are displayed (F315 and F316). It appears to the user operating the remote commander R that moving the pointer P fully to the right on the screen on which control on the VTR can be performed, causes the screen on which control on the VDP can be performed to appear as the right page side of the previous screen as shown in the conceptual view in FIG. 18. At this time, the x-coordinate value of the pointer P is changed from 255 to 1 so that the pointer P appears at the left end of the screen for the VDP (F317).

When the pointer has been moved fully to the left on the screen on which the control pictures for the VTR had been displayed as described above and the screen for input switching thus called up are currently displayed, the process proceeds from step F305 to F349 upon the input of a command code (F301). Then, the contents of the command is determined (F349). If it is x-y position change information, a new pointer position is calculated on the x-y coordinate system accordingly (F352) and the pointer P is moved to the new pointer position on the screen (F353). Then, it is determined whether the position of the pointer P on the x-coordinate equals 255 (F354) and, if not, the process returns to step F301 without any further action.

When the pointer is moved to reach the position on x-coordinate which equals 255 at step F354, i.e., when the pointer P is moved fully to the right end of the screen for controlling input switching, the screen for controlling input switching currently displayed is erased and the control pictures SD for VTR are displayed (F355). The value of x for the pointer position at this time is set to 1 so that the pointer P appears in the vicinity of the left end of the screen showing the control pictures SD for the VTR (F356). It appears to the user that the screen for controlling the VTR is on the right page side of the screen for the input switching.

If the "enter" command is input when the control pictures for controlling input switching are displayed on the screen as shown in FIG. 16, the process proceeds to step F350. At step F350, the control portion 23 outputs the command signal for input switching to the audio input selector portion 11 and the video input selector portion 14 so that the apparatus pointed by the pointer P at this point in time is selected as the input.

When the input switching has been performed as described above, the control pictures for controlling input switching are erased and the group of control pictures for the apparatus selected are displayed as in the first embodiment (F351).

When the pointer P is moved to the left end of the screen, i,e, when the x-coordinate value of the pointer equals 0 with the control pictures for the VDP displayed, the control pictures for the VDP which have been displayed are erased and the control pictures for the VTR are displayed (F325 and F327). The x-coordinate value of the pointer P is changed from 0 to 254 so that the pointer P appears at the right end of the screen showing the control pictures for the VTR (F328).

When the pointer P is moved to the right end of the screen, i,e, when the x-coordinate value of the pointer equals 255 with the control pictures for the VDP similarly displayed, the control pictures for the VDP which have been displayed are erased and the control pictures for the TV tuner are displayed (F326 and F321). The x-coordinate value of the pointer P is changed from 255 to 1 so that the pointer P appears at the left end of the screen showing the control pictures for the TV tuner (F330).

When the pointer P is moved to the left end of the screen, i,e, when the x-coordinate value of the pointer equals 0 with the control pictures for the TV tuner displayed, the control pictures for the TV tuner which have been displayed are erased and the control pictures for the VDP are displayed (F335 and F337) The x-coordinate value of the pointer P is changed from 0 to 254 so that the pointer P appears at the right end of the screen showing the control pictures for the VDP (F338).

When the pointer P is moved to the right end of the screen, i,e, when the x-coordinate value of the pointer equals 255 with the control pictures for the TV tuner similarly displayed, the control pictures for the TV tuner which have been displayed are erased and the control pictures for the CD player are displayed (F336 and F339). The x-coordinate value of the pointer P is changed from 255 to 1 so that the pointer P appears at the left end of the screen showing the control pictures for the CD player (F340).

Further, when the pointer P is moved to the left end of the screen, i,e, when the x-coordinate value of the pointer equals 0 with the control pictures for the CD player displayed, the control pictures for the CD player which have been displayed are erased and the control pictures for the TV tuner are displayed (F345 and F346). The x-coordinate value of the pointer P is changed from 0 to 254 so that the pointer P appears at the right end of the screen showing the control pictures for the TV tuner (F347).

As a result of the above-described process shown in FIG. 19, the display for control is switched as conceptually shown in FIG. 18 and the user can control each apparatus by operating the remote commander R. The control screen for each apparatus can be called up by moving the pointer P fully to the left or right end, which operation feels like turning a page of a book. The ends of two virtually adjoining screens where the calling up of each other is performed are set in opposite positions on the screen and the previous screen can be called up in a manner that feels like turning a page of a book. This makes the operation easy to understand and eliminates the need for the "enter" operation or the like in switching the screens, thereby significantly improving operability.

A third embodiment of the present invention will now be described with reference to FIG. 20 and FIG. 21. The remote control system of the present embodiment also has the same configuration as that shown in FIG. 1 and FIG. 2 and the description of the same will therefore be omitted.

Figure 20:
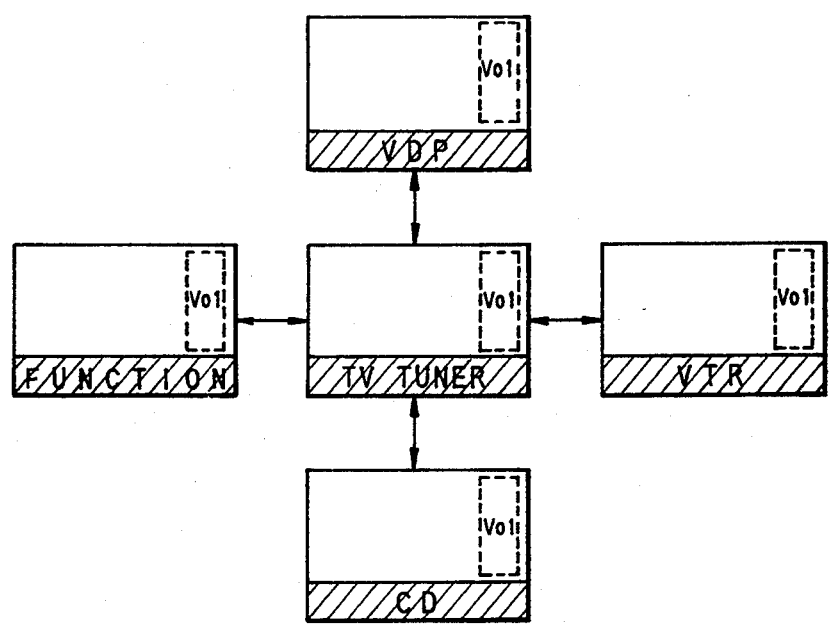
FIG. 20 illustrates display operations of a third embodiment of the present invention.
Figure 21:
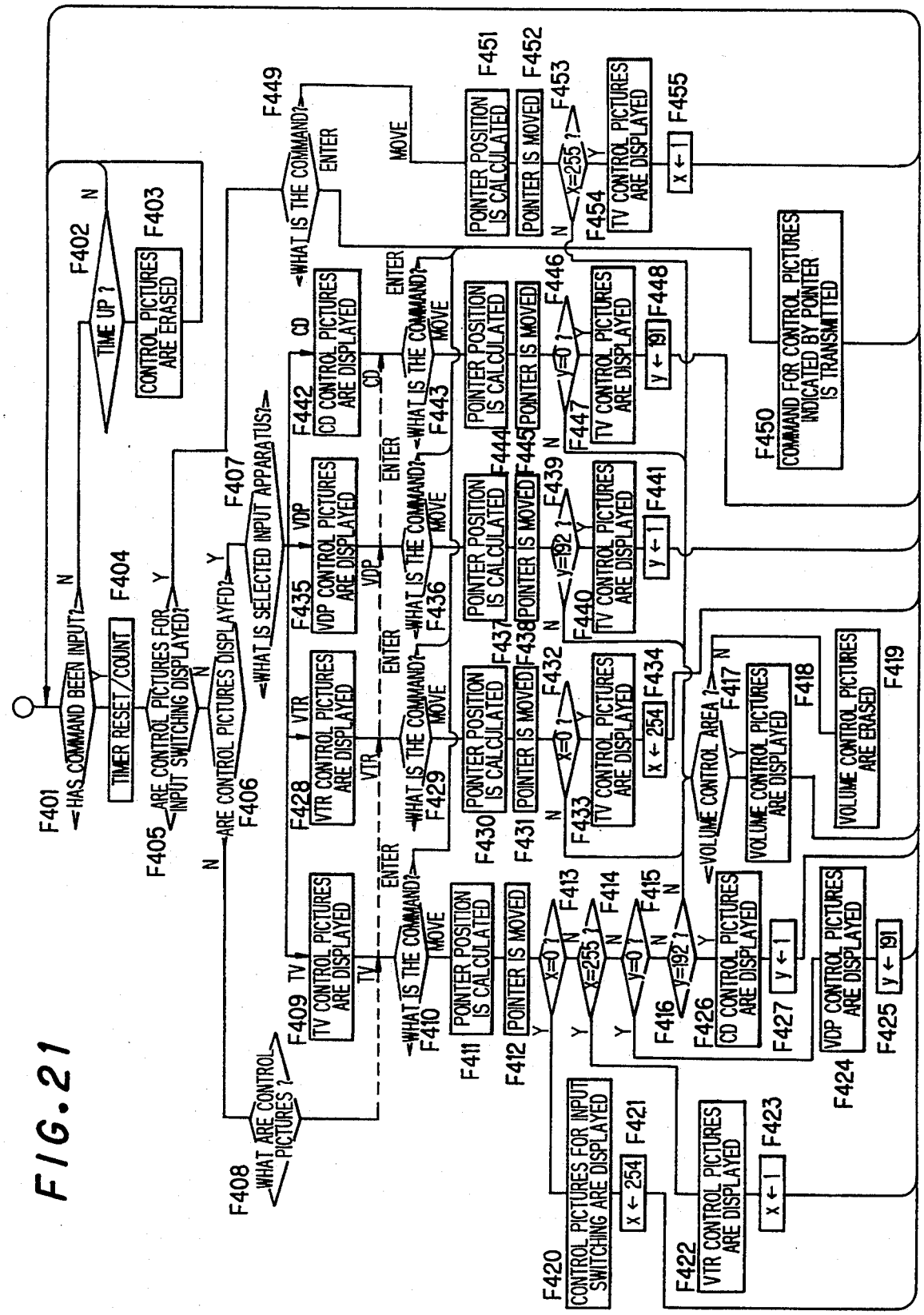
FIG. 21 is a flow chart for remote control operations of the third embodiment of the present invention.

FIG. 21 is a flow chart showing the process performed by the control portion 23 in accordance with position specification information (x-y position change information and "enter") transmitted by the remote commander R. FIG. 20 conceptually shows operations Of switching the display of control pictures SD for controlling various apparatus. In FIG. 20, the shaded areas represent a portion where the control pictures for those apparatus are displayed.

In the second embodiment, the switching of display takes place between the groups of control pictures for the apparatus when the pointer is moved to the left or right. In this third embodiment, the switching takes place when the pointer is moved to the left or right or upward or downward.

For example, when the control pictures for the TV tuner are displayed as shown in FIG. 20, the control pictures for input switching appear if the pointer P is moved fully to the right: the control pictures for the VTR appear if the pointer P is moved fully to the left: the control pictures for the VDP appear if the pointer P is moved fully upward: and the control pictures for the CD player appear if the pointer P is moved fully downward.

The control pictures for input switching are treated similarly to the control pictures for the apparatus. That is, the switching to the control pictures for input switching is not performed. As to volume control, in any mode wherein control pictures are displayed, the control pictures for volume adjustment are displayed as the pointer P enters the area A shown in FIG. 10 to improve volume-controllability.

The processes at the control portion 23 to perform such display switching and command transmission operations in accordance with the specification of control pictures are illustrated with reference to FIG. 21.

Upon the input of any command code (F401) from the remote commander R, the control portion 23 resets the timer to start time measurement (F404) and, thereafter, determines whether the control pictures for input switching are currently displayed (F405).

The processes of resetting and starting of the timer at step F404 and the erasing of control pictures at a timeout at steps F402 and F403 are similar to those in the above-described first and second embodiments. They are for avoiding unnecessary display of the control pictures SD and the pointer P.

If the control pictures for input switching are not displayed, it is determined whether the display is in a state wherein no control picture is displayed as shown in FIG. 11 (F406). If the state of display is as shown in FIG. 11, it is determined what is currently selected by the audio input selector portion 11 and the video input selector portion 14 (F407) and the process step to follow is decided depending on the status of input selection.

In the third embodiment, the process proceeds to step F409 if the TV tuner 63 has been elected as the input, to step F428 if the VTR 61 has been selected, to step F435 if the VDP 64 has been selected, and to step F442 if the CD player 62 has been selected. As a result, the monitor device 70 displays the group of control pictures for the TV tuner 63 (F409), the group of control pictures for the VTR 61 (F428), the group of control pictures for the VDP 64 (F435), or the group of control pictures for the CD player 62 (F442).

If any group of control pictures have already been displayed at step F406, depending on the group displayed, the process proceeds to step F410 if the control pictures for the TV tuner are displayed, to step F429 if the control pictures for the VTR are displayed, to step F436 if the control pictures for the VDP are displayed, and to the step F443 if the control pictures for he CD player are displayed.

If a command code is input from the remote commander R in the mode wherein the control pictures for input switching are displayed, the process proceeds from step F405 to F449.

Each of steps F410, F429, 436, F443 and F449 determines the contents of commands. If a command is determined to be the "enter" command, the process proceeds from any of those steps to step F450 at which the command signal for the control pictures printed by the pointer P when the "enter" command is input is read from a ROM 32b or RAM 32c to be transmitted from the infrared transmission portion 26 or the like.

If any of steps F410, F429, 436, F443 and F449 of the respective modes wherein the respective groups are displayed determines the contents of a command as x-y position change information, a pointer moving process is entered. Specifically, a new pointer position is calculated on the coordinate system (F411, F430, F437, F444 and F451). The calculated pointer position is transmitted to the graphic controller 25 to move the pointer p on the screen (F412, F431, F438, F445 and F452 ).

In any mode wherein a group of control pictures are displayed, if the pointer P enters the area A shown in FIG. 10 as a result of the movement of the pointer P, the control pictures for volume control are displayed as shown in FIG. 14 (F417 and F418) enabling volume control. If the pointer is out of the area A, the control pictures for volume control are not displayed (erased) (F417 and F419).

When the pointer P is moved to the left end of the screen, i,e, when the x-coordinate value of the pointer equals 0 with the control picture for the TV tuner displayed, the control pictures for the TV tuner which have been displayed are erased and the control pictures for input switching are displayed (F413 and F420). The x-coordinate value of the pointer P is changed from 0 to 254 so that the pointer P appears at the right end of the screen display for input switching (F421).

As a result, it appears to the user operating the remote commander R that the control pictures for input switching appear at the left page side of the screen for the TV tuner.

When the pointer P is moved to the right end of the screen, i,e, when the x-coordinate value of the pointer equals 255 with the control pictures for the TV tuner similarly displayed, the control pictures for the TV tuner which have been displayed are erased and the control pictures for the VTR are displayed (F414 and F422). The x-coordinate value of the pointer P is changed from 255 to 1 so that the pointer p appears at the left end of the screen on which control on the VTR can be performed (F421). In other words, it appears to the user that the control pictures for the VTR appear at the right page side of the screen for the TV tuner.

When the pointer P is moved to the upper end of the screen, i,e, when the y-coordinate value of the pointer equals 0 with the control pictures for the TV tuner similarly displayed, the control pictures for the TV tuner which have been displayed are erased and the control pictures for the VDP are displayed (F415 and F424). The y-coordinate value of the pointer p is changed from 0 to 191 so that the pointer P appears at the lower end of the screen on which control on the VDP can be performed (F425). In other words, it appears to the user that the control pictures for the VDP appear at the upper side of the screen for the TV tuner.

When the pointer P is moved to the lower end of the screen, i,e, when the y-coordinate value of the pointer equals 192 with the control pictures for the TV tuner similarly displayed, the control pictures for the TV tuner which have been displayed are erased and the control pictures for the CD player are displayed (F416 and F426). The y-coordinate value of the pointer P is changed from 192 to 1 so that the pointer P appears at the upper end of the screen on which control on the CD player can be performed (F427). In other words, it appears to the user that the control pictures for the CD player appear at the lower side of the screen for the TV tuner.

When the control pictures for the VTR are displayed, it is detected whether the pointer P has reached the left end of the screen or not (F432). When the x-coordinate value of the pointer equals 0 at which value the pointer is at the left end of the screen, the control pictures for the VTR which have been displayed are erased and the control pictures for the TV tuner are displayed (F432 and F433). The x-coordinate value of the pointer P is changed from 0 to 255 so that the pointer p appears at the right end of the screen showing the control pictures for the TV tuner (F434).

When the control pictures for the VDP are displayed, it is detected whether the pointer P has reached the lower end of the screen or not (F439). When the y-coordinate value of the pointer equals 192 at which value the pointer is at the lower end of the screen, the control pictures for the VDP which have been displayed are erased and the control pictures for the TV tuner are displayed (F439 and F440). The y-coordinate value of the pointer P is changed from 192 to 1 so that the pointer P appears at the upper end of the screen showing the control pictures for the TV tuner (F441).

When the control pictures for the CD player are displayed, it is detected whether the pointer P has reached the upper end of the screen or holt (F446). When the y-coordinate value of the pointer equals 0 at which value the pointer is at the upper end of the screen, the control pictures for the CD player which have been displayed are erased and the control pictures for the TV tuner are displayed (F446 and F447). The y-coordinate value of the pointer P is changed from 0 to 192 so that the pointer P appears at the lower end of the screen showing the control pictures for the TV tuner (F448).

When the control pictures for input switching are displayed, it is detected whether the pointer P has reached the right end of the screen or not (F453). When the x-coordinate value of the pointer equals 255 at which value the pointer is at the right end of the screen, the control pictures for input switching which have been displayed are erased and the control pictures for the TV tuner are displayed (F453 and F454). The x-coordinate value of the pointer P is changed from 255 to 1, so that the pointer P appears at the left end of the screen showing the control pictures for the TV tuner (F455)

As a result of the above-described process shown in FIG. 21, the display for control is switched as conceptually shown in FIG. 20 and the user car control each apparatus by operating the remote commander R. The control screen for each apparatus can be called up by moving the pointer P fully to the left or right or upward or downward, which operation feels like turning a page of a book.

Figure 22:
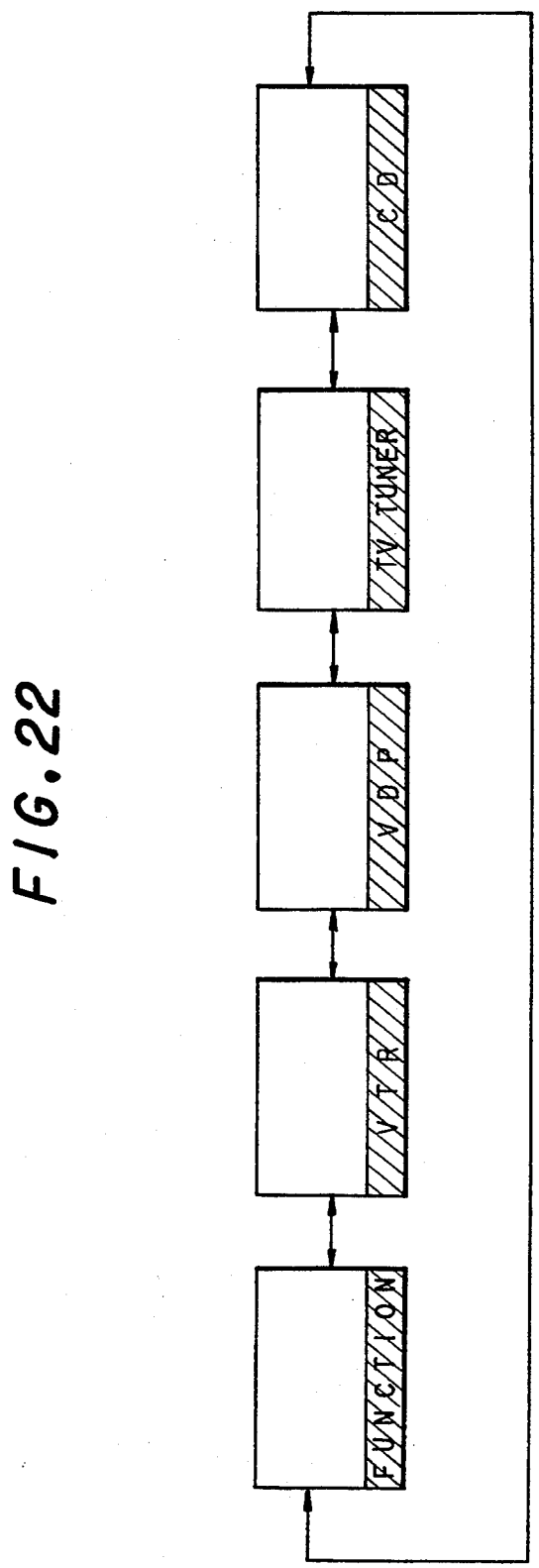
FIG. 22 illustrates display operations of a fourth embodiment of the present invention.

FIG. 22 conceptually shows a fourth embodiment of the present invention which can be regarded as a modification of the second embodiment (The shaded areas represent states wherein the control pictures for the respective apparatus are displayed. This applies to FIG. 23 and FIG. 24.). Briefly, starting with the display of the control pictures for input switching, the display is sequentially switched to the control pictures for the VTR, the control pictures for the VDP, the control pictures for the TV tuner, and the control pictures for the CD player each time the pointer P is moved fully to the right. Further, if the pointer is moved fully to the right in the mode wherein the screen displays the control pictures for the CD player, the switching takes place in a circulating manner by returning the display mode to the display of the control pictures for input switching.

Figure 23:
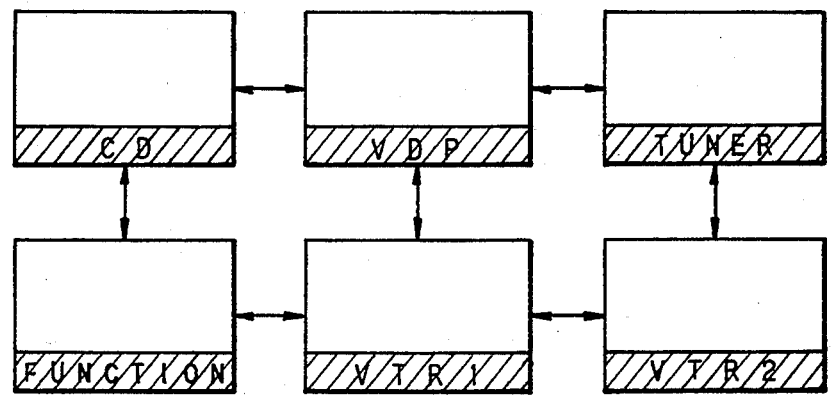
FIG. 23 illustrates display operations of a fifth embodiment of the present invention.

FIG. 23 conceptually shows a fifth embodiment of the present invention. As illustrated, a virtual positional relationship is maintained between the groups of control pictures. In the fifth embodiment, if the pointer is moved fully in the direction of the arrow shown in the screen showing each group of control pictures, another group of control pictures are called up.

In the implementation of the fourth and fifth embodiments, again, the control portion 23 may be adapted to control the switching of pictures by detecting that the pointer reaches upper, lower, left or right end of the screen with reference to the x and y values of the position of the pointer.

Figure 24:
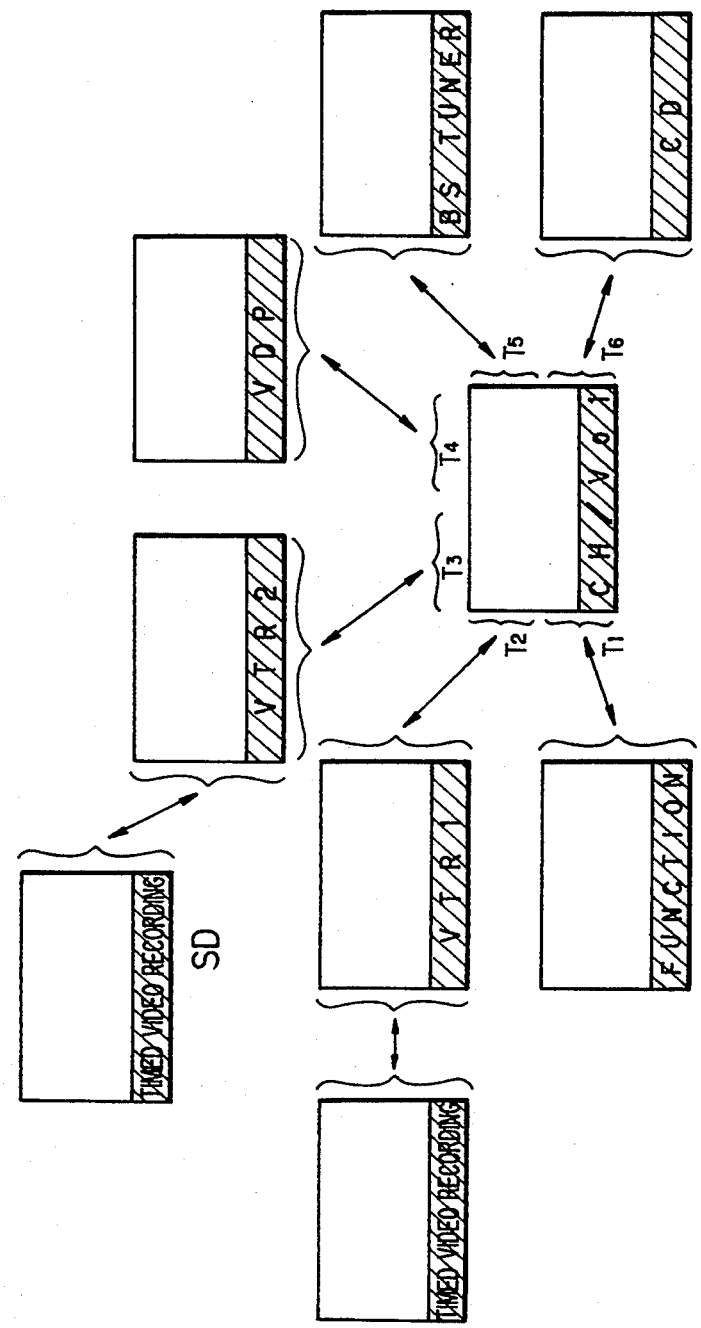
FIG. 24 illustrates display operations of a sixth embodiment of the present invention.

FIG. 24 conceptually shows a sixth embodiment of the present invention. In the above-described first through fifth embodiments, the side of a screen corresponding to an end of the area wherein pictures are displayed is set, in its entirety, as an area for calling up the next pictures. In the sixth embodiment, however, an end of a screen is divided into several areas so that more pictures can be called up.

Figure 25:
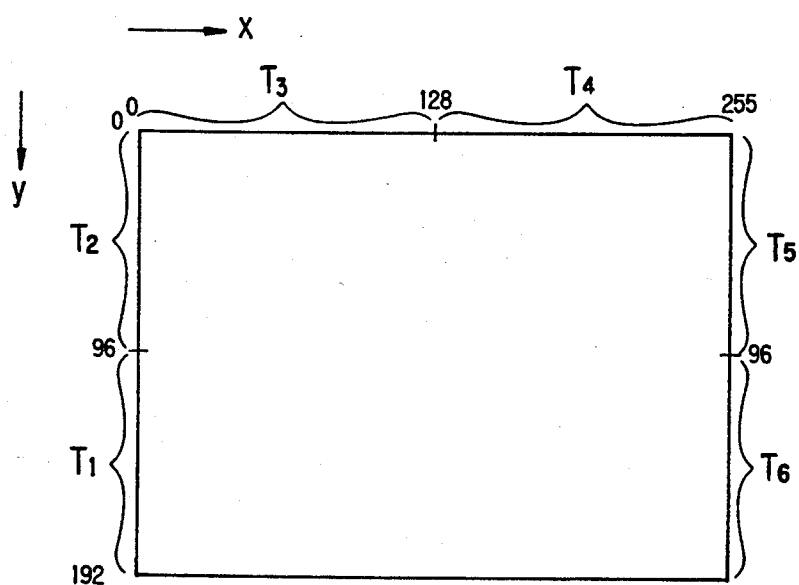
FIG. 25 illustrates the setting of end portions according to the sixth embodiment of the present invention.

In the case shown in FIG. 24, for example, the state wherein the control pictures for the TV tuner (the control pictures for channel, volume, and the like) are displayed, is regarded as a reference mode. In this mode of screen, the control portion 23 recognizes the upper, left and right ends of a screen as six divisions on the x-y coordinate system as shown in FIG. 25.

For example, end portions $T_1$, $T_2$, $T_3$, $T_4$, $T_5$ and $T_6$ are managed as areas wherein (x=0, $96 \leq y \leq 192$), (x=0, $0 \leq y < 96$), ($0 \leq x < 128$, y=0), ($128 \leq x \leq 255$, y=0), (x=255, $0 \leq y < 96$), and (x=255, $96 \leq y \leq 192$), respectively.

The control pictures associated with the end portions $T_1$, $T_2$, $T_3$, $T_4$, $T_5$, and $T_6$ to be called up are the control pictures for input switching, control pictures for a first VTR, control pictures for a second VTR, the control pictures for the VDP, control pictures for a BS tuner, and the control pictures for the CD player, respectively. Specifically, when the pointer P reaches any one of the end portions $T_1$ through $T_6$, the associated control pictures are displayed instead of the control pictures for the TV tuner.

An end portion is set for calling up the control pictures for the TV tuner from the control pictures called up at the end portions $T_1$ through $T_6$ so that directional relationships are established between the control pictures called up at the end portions $T_1$ through $T_6$ and the control pictures for the TV tuner.

Specifically, if the control pictures for input switching or the control pictures for the first VTR which are virtually positioned to the left of the control pictures for the TV tuner are displayed, the control pictures for the TV tuner are called up when the pointer reaches the right end (x=255) of the screen. If the control pictures for the second VTR or the control pictures for the VDP which are virtually positioned above the control pictures for the TV tuner are displayed, the control pictures for the TV tuner are called up when the pointer reaches the lower end (y=192) of the screen. If the control pictures for the BS tuner or the control pictures for the CD player which are virtually positioned to the right of the control pictures for the TV tuner are displayed, the control pictures for the TV tuner are called up when the pointer reaches the left end (x=0) of the screen.

According to the present embodiment, it is possible to call up a plurality of groups of control pictures from one picture mode by dividing the ends of the screen. In addition, the directions in which the screen modes are called up can be correlated, i.e. the ends at which the screens are switched are set substantially opposite to each other, and operability is thus improved.

In the sixth embodiment, other groups of control pictures (e.g., control pictures for timed picture recording) are called up from the left end of the screen showing the control pictures for the first or second VTR. The control pictures are thus organized into a virtual hierarchical structure and the switching of the control pictures takes place between basic operations as a first hierarchical level and complicated operations and operations such as adjustment as second and third hierarchical levels. This allows more diverse operations without adversely affecting operability. Of course, the end portions may be divided at the second and third hierarchical levels.

Figure 26A:
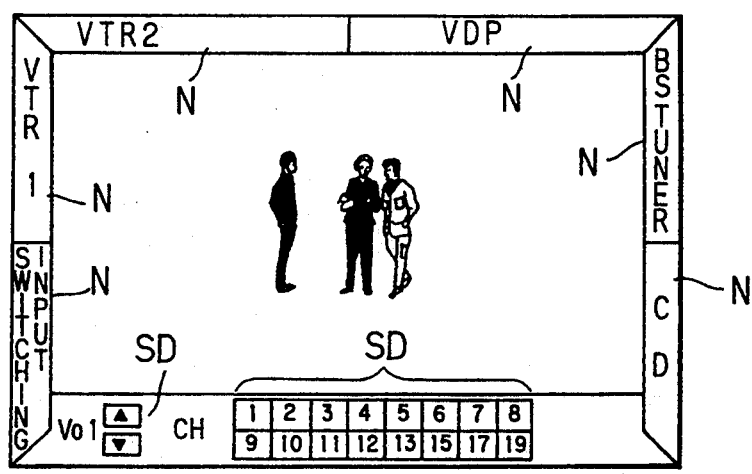
FIG. 26a and FIG. 26b illustrate states of display according to a seventh embodiment of the present invention. Both of FIG. 26a and FIG. 26b show states of the display of mode names for control pictures.
Figure 26B:
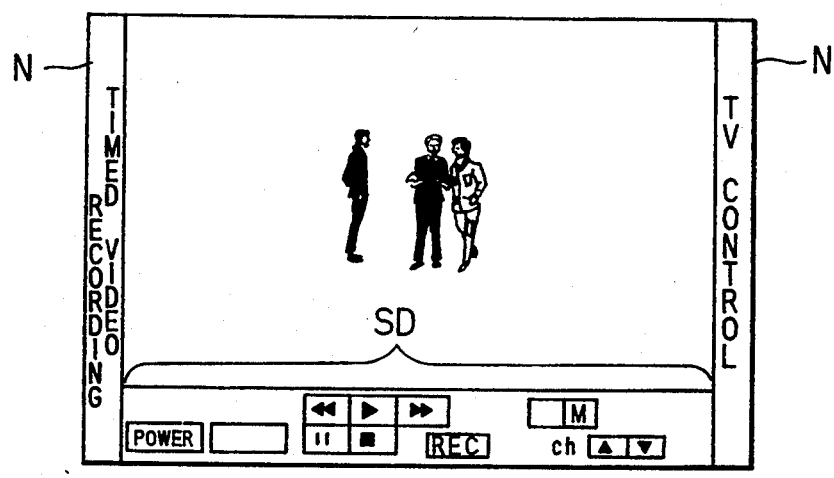

FIG. 26a and FIG. 26b illustrate a seventh embodiment of the present invention.

The seventh embodiment is preferably combined with, for example, the sixth embodiment. According to the present embodiment, in a control picture display mode, other groups of control pictures which are called up at the ends of the screen are displayed.

For example, if the control pictures SD for the TV tuner are displayed in the sixth embodiment, control picture mode names N, e.g., "input switching", "VTR 1", "VTR 2", "VDP", "BS tuner", and "CD", are displayed at the respective end portions $T_1$ through $T_6$ set as shown in FIG. 26a. Similarly, when the switching to the control pictures for the first VTR takes place at the end portion $T_2$, for example, control picture mode names N, e.g., "timed picture recording" and "TV operation" are displayed at the left end and right end, respectively, of the screen.

Such display prevents the screen switching from becoming difficult even if the virtual screen arrangement becomes complicated and the number of screens is increased. It goes without saying that such display is effective as a guidance for operations even when the number of the screens switched is small as in the first embodiment.

Although the display of the guidance for the screens directly called up from a certain display has been described, guidance can be displayed for a screen which is called up from the screen by way of one or a plurality of screens. Especially, if a hierarchical structure is employed or a number of screens are virtually linked in the manner as in the second embodiment, the complication of operations can be avoided by guiding the (virtual) direction in which the desired screen can be called up from the screen currently displayed.

Figure 27:
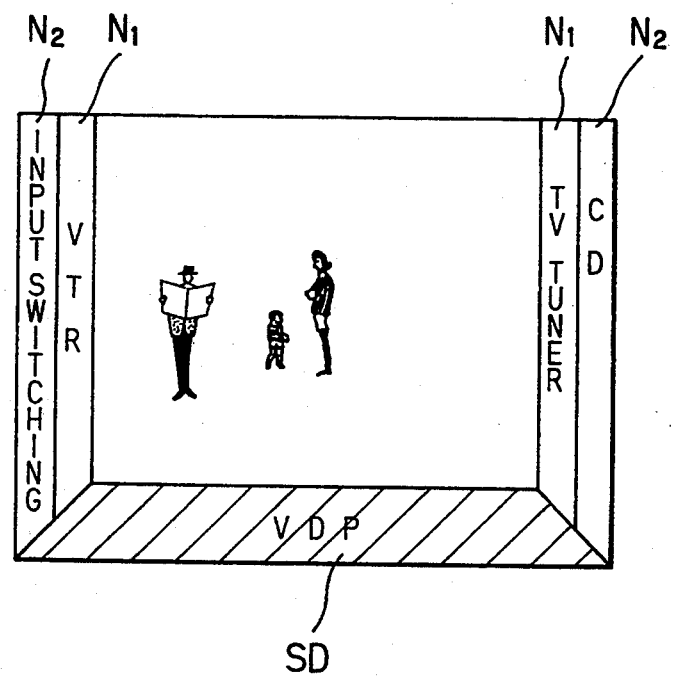
FIG. 27 illustrates a state 6f display according to an alternative to the seventh embodiment of the present invention.

For example, in the mode wherein the control pictures for the VDP are displayed in the second embodiment shown in FIG. 18, "VTR" and "TV tuner" are displayed as the mode names $N_1$ for virtually adjoining control pictures as shown in FIG. 27. If "input switching" and "CD" are further displayed as control picture mode names $N_2$ outside the control picture mode names $N_1$, there is no possibility that the desired screen can not be found and the user is confused in operation.

Although various embodiments of the present invention have been described, the remote control system according to the present invention is not limited thereto and may of course be implemented in various other ways. For example, the apparatus controlled may include a multi-disk player capable of reproducing a plurality of kinds of optical disks instead of the VDP 64.

Although the control pictures for the audio-visual apparatus connected to the AV selector amplifier 10 are switched in the above embodiments, the objects to be controlled may include electronic apparatus such as an air conditioner which have no relationship with the AV selector amplifier 10. If it is desirable to add some apparatus to be controlled, such a demand can be satisfied by causing the remote control system to learn the command codes for such, storing them in the RAM 23c and adding the control pictures SD at the same time.

Needless to say, the remote control system according to the present invention may be incorporated in a device other than the AV selector amplifier or may be formed alone.

Further, the control pictures for volume control are displayed when the pointer enters a preset control area in the embodiments. For example, this method may also be employed for control display for channel switching. This is preferable especially for operations which are likely to be frequently performed. Of course, the position and size of a control area to be set can be varied.

What is claimed is:

1. A remote control system comprising:
   an operation input means for outputting position specification information through line or radio transmission in accordance with an operation;
   a reception means for receiving the position specification information transmitted by said operation input means;
   a memory means for storing various command codes which are divided into a plurality of groups;
   a display control means for outputting for display on a display screen control pictures corresponding to the command codes stored in said memory means in groups in accordance with the position specification information received by said reception means and for outputting for display a position specification picture indicating one of the control pictures output for display;
   a command generation means for reading the command code corresponding to the control picture specified by said position specification picture in accordance with the position specification information received by said reception means and for outputting the same; and
   a transmission means for transmitting the command code output by said command generation means to an apparatus or portion to be controlled
   wherein when one of said groups of control pictures is displayed, if said position specification picture is moved on the display screen to an area which is a part or the whole of an edge portion surrounding the control pictures in accordance with the position specification information received by said reception means, said display control means switches the display of control pictures to a predetermine group of control pictures which is different from the group of control pictures currently displayed.

2. The remote control system according to claim 1 wherein, on a screen position displaying a certain group of control pictures, a plurality of areas, each being a part of the edge portion surrounding the control pictures are provided, and each area is associated with a group of control pictures; and, when said position specification picture is moved to a certain one of said areas in accordance with the position specification information received by said reception means, said display control means switches the display of control pictures to the group of control pictures associated with the area.

3. The remote control system according to claim 1 or claim 2 wherein said display control means displays the group or groups of control pictures associated with one or a plurality of edge portions set on the screen position on which a certain group of control pictures are displayed.

4. The remote control system according to claim 1 or claim 2 wherein, on the screen position displaying a second group or control picture called upon in association with an edge portion of the screen displaying a first group of control pictures, an edge portion associated with the first group of control pictures is provided and wherein the edge portion of the screen showing the first group of control pictures adapted to call up the second group of control pictures and the edge portion of the screen showing the second group of control pictures adapted to call up the first group of control pictures are set to be positioned substantially opposite to each other on the periphery of the screen.

5. A remote control system comprising:
   an operation input means for outputting position specification information through line or radio transmission in accordance with an operation;
   a reception means for receiving the position specification information transmitted by said operation input means;
   a memory means for storing various command codes which are divided into a plurality of groups;
   a display control means for outputting for display on a display screen the control pictures corresponding to the command codes stored in said memory means in groups in accordance with the position specification information received by said reception means and for outputting for displays a position specification picture indicating one of the control pictures output for display;
   a command generation means for reading the command code corresponding to the control picture specified by said position specification picture in accordance with the position specification information received by said reception means and for outputting the same; and
   a transmission means for transmitting the command code output by said command generation means to an apparatus or portion to be controlled,
   wherein a control area associated with the control picture(s) indicating one or a plurality of command codes stored in said memory means is set in the display screen and wherein said display control means causes the control pictures indicating said particular command code(s) to be displayed when said position specification picture is moved into said control area on the display screen in accordance with the position specification information received by said reception means.

6. A control method for a remote control system comprising a remote input means for transmitting a position specification signal, a memory means for storing a plurality of picture data constituted by a plurality of mode setting data for setting the operation modes of a plurality of apparatus to be controlled and a plurality of command codes corresponding to said picture data, and a control means which is supplied with the position specification signal from said remote control means, for reading the picture data corresponding to the position specification signal supplied from said memory means, displaying said picture data on a display means, reading the command code corresponding to the position specification signal supplied from said memory means, and supplying it to said apparatus to be controlled,
   wherein, with the picture data read from said memory means displayed on said display means, said control means reads a command code from said memory means in accordance with the position specification signal corresponding to said mode setting data input by said remote input means and supplies it to said apparatus to be controlled; and when said control means detects that the position specification signal input by said remote input means is a signal corresponding to a certain position, it reads the picture data corresponding to the position specification signal input by said remote input means from said memory means and displays the picture data newly read from said memory means instead of the picture data currently displayed on said display means.

7. The control method for a remote control system according to claim 6 wherein the position of the position specification signal input by said remote input means on said display means is detected by said control means and, in accordance with the result of the detection performed by said control means, the picture at a corresponding to the position specification signal input by said remote input means are read from among the plurality of picture data stored in said memory means and are displayed instead of the picture data which have been displayed on said display means.

8. The control method for a remote control system according to claim 7 wherein additional picture data indicating a plurality of apparatus to be controlled are displayed by said control means in advance at the periphery of said display means.

9. The control method for a remote control system according to claim 6 wherein when said selection picture data for selecting a plurality of apparatus to be controlled are stored in said memory means, said control means reads the picture data corresponding to the position specification signal input by said remote input means from said memory means with said selection data displayed on said display means and displays the picture data read from said memory means instead of said selection picture data.

10. The control method for a remote control system according to claim 6 wherein when said control means detects that the value of the position specification signal input by said remote input means has become a predetermined value with said picture data displayed on said display means, additional picture data for adjusting the output level of said apparatus stored in said memory means are displayed on said display means with said picture data remaining on said display means.

11. The control method for a remote control system according to claim 6 wherein a pointer indicating the position on said display screen of the position specification signal input by said remote input means is displayed by said control means on said display means, and said pointer is moved on said display means in response to changes in the position specification signal input by said remote input means.

12. A remote control system comprising:
   a remote input means for transmitting a position specification information signal when it is operated;
   a reception means for receiving the position specification information signal input by said remote input means;
   a memory means for storing first picture data constituted by a plurality of mode setting data corresponding to a plurality of operation modes of at least one apparatus to be controlled, second picture data for controlling the output state of said apparatus and a plurality of command codes corresponding to said operation modes and said second picture data;
   a display control means for reading said first or second picture data in accordance with the position specification information signal output by said reception means and for displaying the data on a display means;

a command generation means for reading from said memory means the command code corresponding to said mode setting data or said second picture data specified by the position specification information signal input by said remote input means with said first or second picture data displayed on said display means and for outputting the data; and a transmission means for transmitting the command code output by said command code generation means to said at least one apparatus to be controlled, wherein said display control means displays said second picture data on said display means when the position specification information signal input by said remote input means indicates a predetermined position on said display means with said first picture data displayed on said display means.

13. A remote control system comprising:

a remote input means for transmitting a position specification information signal when it is operated;

a reception means for receiving the position specification information signal input by said remote input means;

a memory means for storing first picture data constituted by a plurality of mode setting data corresponding to a plurality of operation modes of a plurality of apparatus to be controlled, second picture data for controlling the output state of said apparatus and a plurality of command codes corresponding to said operation modes and said second picture data;

a display control means for reading said first or second picture data in accordance with the position specification information signal output by said reception means and for displaying the data on a display means;

a command generation means for reading from said memory means the command code corresponding to said mode setting data or said second picture data specified by the position specification information signal input by said remote input means with said first or second picture data displayed on said display means and for outputting the data; and a transmission means for transmitting the command code output by said command code generation means to said at least one apparatus to be controlled, wherein, with said first picture data displayed on said display means, said display control means reads another item of said first picture data from said memory means and displays the data on said display means when it detects that the position specification information signal input by said remote input means has reached a position corresponding to a peripheral portion of said display means, and reads said second picture data from said memory means and displays the data on said display means when it detects that the position specification information signal input by said remote input means has reached a predetermined position on said display means.

14. A remote control system comprising:

an audio apparatus for reproducing at least one audio signal;

a video apparatus for reproducing at least one video signal and one audio signal;

a remote input means for transmitting a position specification signal;

a selector having a receiving portion connected to said audio apparatus and said video apparatus for receiving the position specification signal from said remote input device, a memory portion for storing picture data including mode setting data for setting a plurality of operation modes of said audio apparatus and said video apparatus, command codes corresponding to said operation modes, and selection picture data for selecting said audio apparatus or said video apparatus, a control portion for reading picture data from said memory portion in accordance with the position specification signal input by said remote input means when it detects that the input position specification signal is a signal indicating a predetermined position, and a command generating portion for selectively supplying the command codes to said audio apparatus or said video apparatus in accordance with the input position specification signal; and an output device having a display portion to which the picture data read by said control portion from said memory portion are supplied and being supplied with the output signal of either said audio apparatus or said video apparatus as selected by said selector, wherein, with the picture data for either said audio apparatus or said video apparatus displayed on said display portion, the control portion of said selector reads a command code from said memory device in accordance with the position specification signal input by said remote input device and supplies it to at least either one of said audio apparatus or said video apparatus from said command generation portion and wherein, when said control portion detects that the position specification signal input by said remote input device is a signal indicating the position corresponding to any one of the four sides of said display portion with the picture data of either said audio apparatus or said video apparatus displayed on said display device, either the picture data associated with the other apparatus or said selection picture data are read from said memory portion and are displayed on said display portion.

15. The remote control system according to claim 14 wherein the display of the picture data associated with either said audio apparatus or said video apparatus displayed on said display portion are erased after a predetermined elapse time.

* * * * *